US012659999B2

(12) United States Patent
Xiong et al.

(10) Patent No.: US 12,659,999 B2
(45) Date of Patent: Jun. 16, 2026

(54) METHOD AND APPARATUS FOR TRANSMITTING AN UPLINK SIGNAL IN A WIRELESS COMMUNICATION SYSTEM

(71) Applicant: Samsung Electronics Co., Ltd., Suwon-si (KR)

(72) Inventors: Qi Xiong, Beijing (CN); Feifei Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 704 days.

(21) Appl. No.: 17/630,493

(22) PCT Filed: Jul. 27, 2020

(86) PCT No.: PCT/KR2020/009847
§ 371 (c)(1),
(2) Date: Jan. 26, 2022

(87) PCT Pub. No.: WO2021/020832
PCT Pub. Date: Feb. 4, 2021

(65) Prior Publication Data
US 2022/0264653 A1 Aug. 18, 2022

(30) Foreign Application Priority Data
Jul. 26, 2019 (CN) .......................... 201910681206.8

(51) Int. Cl.
*H04W 74/0833* (2024.01)
*H04W 74/00* (2009.01)
(Continued)

(52) U.S. Cl.
CPC ..... *H04W 74/0833* (2013.01); *H04W 74/006* (2013.01); *H04L 1/1812* (2013.01); *H04W 74/0836* (2024.01); *H04W 74/0838* (2024.01)

(58) Field of Classification Search
None
See application file for complete search history.

(56) References Cited

U.S. PATENT DOCUMENTS 11,357,054 B2 6/2022 Lu et al.
11,470,647 B2 10/2022 Zhao et al.
(Continued)

FOREIGN PATENT DOCUMENTS

CN 108282899 A 7/2018
WO 2018/085726 A1 5/2018
(Continued)

OTHER PUBLICATIONS

Communication pursuant to Article 94(3) EPC dated Apr. 25, 2024, in connection with European Application No. 20848410.5, 8 pages.
(Continued)

*Primary Examiner* — Mohammad S Adhami

(57) ABSTRACT

The present disclosure provides a transmission method of an uplink signal and a user equipment thereof. The transmission method includes: transmitting a first message comprising a PRACH (Physical Random Access Channel) preamble and data part; receiving a fallback random access response comprising configuration information associated with a transport block size for transmitting a PUSCH (Physical Uplink Shared Channel); determining the transport block size for transmitting the PUSCH by comparing the received configuration information associated with the transport block size with a transport block size of the first message; and transmitting the PUSCH comprising the data part based on the determined the transport block size for transmitting a PUSCH.

13 Claims, 5 Drawing Sheets

(51) Int. Cl.
| | |
|---|---|
| *H04L 1/1812* | (2023.01) |
| *H04W 74/0836* | (2024.01) |
| *H04W 74/0838* | (2024.01) |

(56) References Cited

U.S. PATENT DOCUMENTS

| | | | | |
|---|---|---|---|---|
| 2019/0132882 | A1 | 5/2019 | Li et al. | |
| 2019/0159197 | A1 | 5/2019 | Shrestha et al. | |
| 2019/0215712 | A1 | 7/2019 | Babaei et al. | |
| 2020/0146069 | A1* | 5/2020 | Chen | H04W 76/11 |
| 2020/0288506 | A1* | 9/2020 | Lei | H04W 74/0833 |
| 2020/0351948 | A1* | 11/2020 | Lei | H04L 27/261 |
| 2020/0389924 | A1* | 12/2020 | Lei | H04W 76/11 |
| 2022/0046717 | A1* | 2/2022 | Zhang | H04L 5/0055 |
| 2022/0191948 | A1* | 6/2022 | Lei | H04L 5/0051 |

FOREIGN PATENT DOCUMENTS

| | | | |
|---|---|---|---|
| WO | 2018127244 | A1 | 7/2018 |
| WO | 2019029747 | A1 | 2/2019 |
| WO | WO2020164618 | * | 2/2019 |
| WO | 2019/141685 | A1 | 7/2019 |

OTHER PUBLICATIONS

CATT, "Consideration on 2-step RACH," R2-1903152, 3GPP TSG-RAN2 Meeting #105bis, Xi''an, China, Apr. 8-12, 2019, 6 pages.

LG Electronics Inc, "General 2-Step RACH procedure," R2-1906555 (Revision of R2-1903729), 3GPP TSG-RAN WG2 Meeting #106, Reno, USA, May 13-17, 2019, 3 pages.

Examination report dated Jan. 11, 2023, in connection with Indian Application No. 202247008844, 6 pages.

CMCC, "Discussion on Procedure for 2-step RACH", 3GPP TSG RAN WG1 #97, May 13-17, 2019, R1-1906512, 7 pages.

OPPO, "On Procedure for 2-step RACH", 3GPP TSG RAN WG1 #97, May 13-17, 2019, R1-1906581, 7 pages.

Vivo, "Fallback Procedure from 2-step RACH to 4-step RACH", 3GPP TSG-GAN WG2 Meeting #106, May 13-17, 2019, R2-1905651, 4 pages.

Notification of Transmittal of the International Search Report and the Written Opinion of the International Searching Authority, or the Declaration dated Nov. 16, 2020 in connection with International Patent Application No. PCT/KR2020/009847, 10 pages.

LG Electronics, "Consideration on NR-PUCCH resource allocation", 3GPP TSG RAN WG1 Meeting #89, May 15-19, 2017, R1-1707644, 6 pages.

ZTE et al., "Open aspects of the fallback operation", 3GPP TSG RAN WG2 Meeting #106, May 13-17, 2019, R2-1908021, 4 pages.

Supplementary European Search Report dated Aug. 3, 2022 in connection with European Patent Application No. 20 34 8410, 10 pages.

The First Office Action issued Nov. 29, 2024, in connection with Chinese Patent Application No. 201910681206.8, 31 pages.

Communication under Rule 71(3) EPC dated Dec. 5, 2024, in connection with European Patent Application No. 20848410.5, 66 pages.

Office Action dated Apr. 30, 2025, in connection with Chinese Application No. 201910681206.8, 17 pages.

Notification of the Decision to Grant Patent Right for Patent dated Jun. 18, 2025, in connection with Chinese Application No. 201910681206.8, 10 pages.

Nokia, et al., "Considerations on NR RACH procedures", 3G99 TSG-RAN WG2 Meeting #96, R2-168013, Nov. 2016, 5 pages.

ZTE Corporation, et al., "Msg2 payload contents for 2-step RACH", 3GPP TSG-RAN WG2 Meeting#103-bis, R2-1814034, Oct. 2018, 9 pages.

ZTE Corporation, "Status report for WI NR 2-step RACH", 3GPP TSG RAN meeting #84, RP-190917, 16 pages.

Office Action dated Jul. 22, 2025, in connection with Korean Application No. 10-2020-0093030, 6 pages.

OPPO, "On Procedure for 2-step RACH", 3GPP TSG RAN WG1 #96bis, R1-1905052, Apr. 2019, 5 pages.

Notice of Allowance dated Nov. 26, 2025, in connection with Korean Application No. 10-2020-0093030, 6 pages.

"5G; NR; Physical layer procedures for control; (3GPP TS 38.213 version 15.6.0 Release 15)", ETSI TS 138 213, V15.6.0, Jul. 2019, 110 pages.

"5G; NR; Physical layer procedures for data; (3GPP TS 38.214 version 15.6.0 Release 15)", ETSI TS 138 214, V15.6.0, Jul. 2019, 108 pages.

Nokia, et al. "On 2-step RACH Procedure", 3GPP TSG RAN WG1 #97, R1-1906747, May 2019, 23 pages.

Intel Corporation, "Procedure for two-step RACH", 3GPP TSG RAN WG2#105bis, R2-1904439, Apr. 2019, 7 pages.

CMCC, "Discussion on RACH resources and fallback from 2-step to 4-step random access", 3GPP TSG-RAN WG2 #105bis, R2-1904324, Apr. 2019, 3 pages.

\* cited by examiner

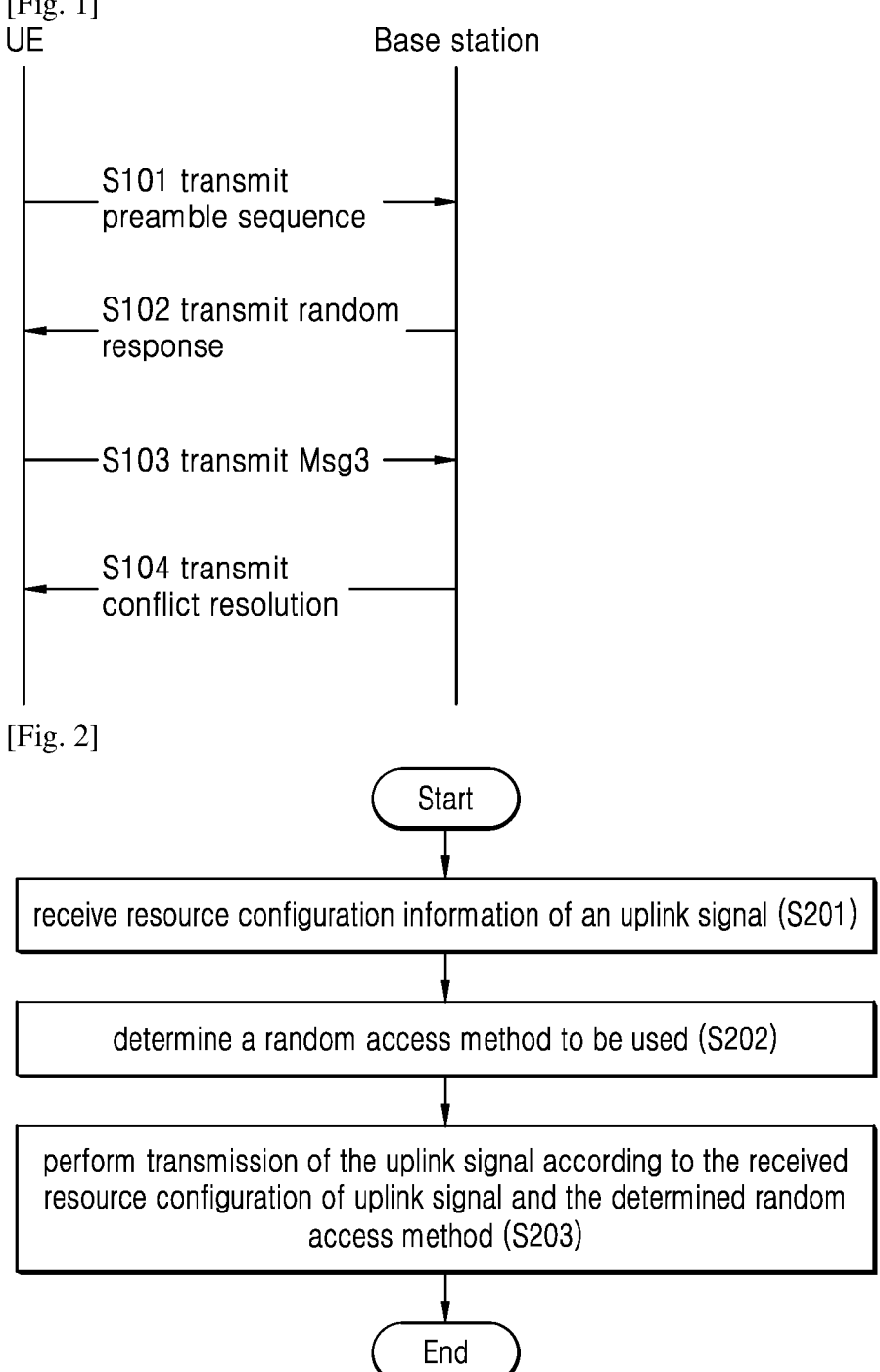

[Fig. 1]

UE                                                    Base station

S101 transmit
preamble sequence

S102 transmit random
response

S103 transmit Msg3

S104 transmit
conflict resolution

[Fig. 2]

Start receive resource configuration information of an uplink signal (S201)

determine a random access method to be used (S202)

perform transmission of the uplink signal according to the received
resource configuration of uplink signal and the determined random
access method (S203)

End

[Fig. 3]

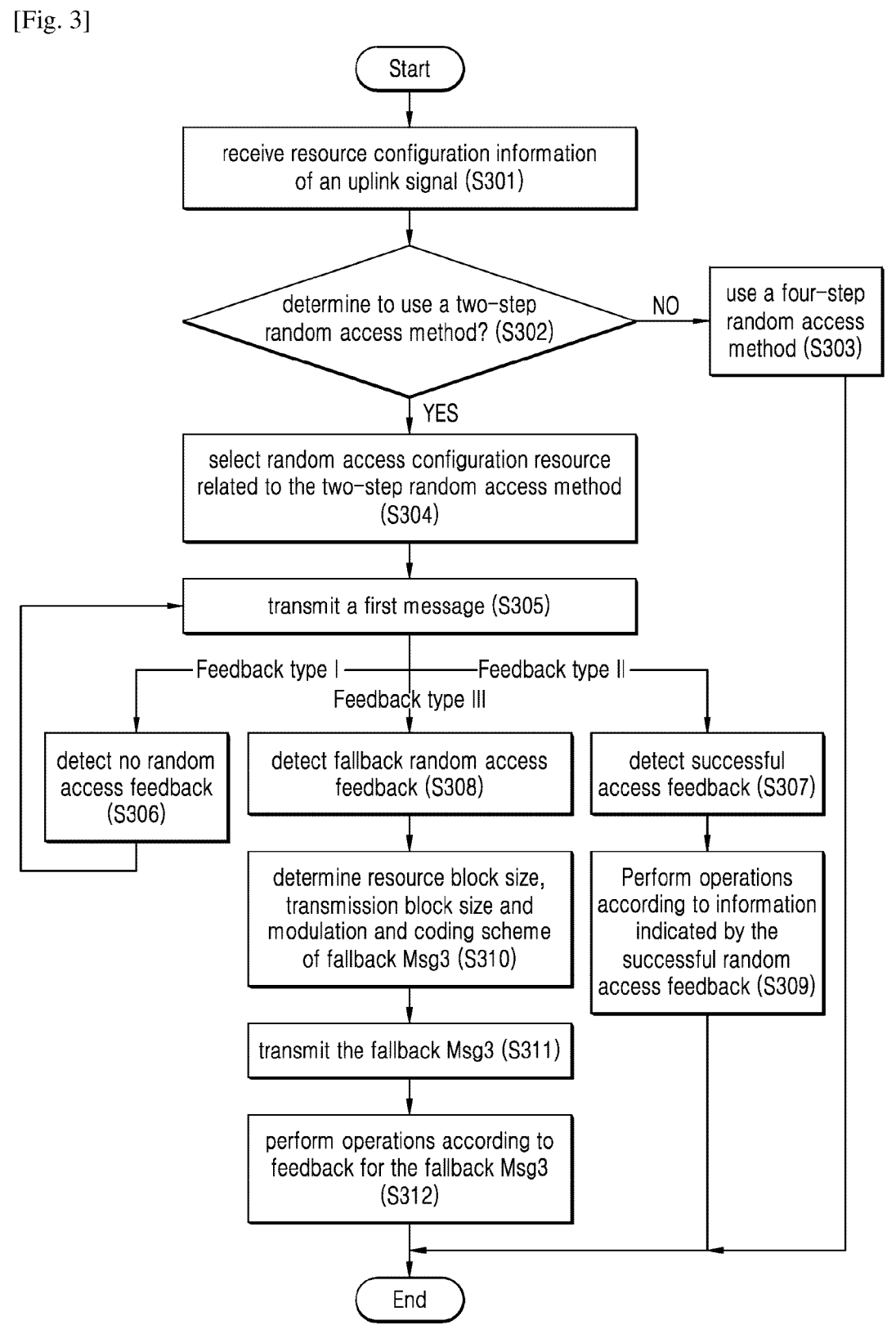

```
                          ( Start )
                              │
                              ▼
        ┌─────────────────────────────────────────┐
        │ receive resource configuration information │
        │        of an uplink signal (S301)          │
        └─────────────────────────────────────────┘
                              │
                              ▼
                  ╱─────────────────────╲              ┌──────────────────┐
                 ╱  determine to use a    ╲     NO      │  use a four-step │
                ⟨   two-step random access ⟩──────────▶ │  random access   │
                 ╲  method? (S302)        ╱             │  method (S303)   │
                  ╲─────────────────────╱               └──────────────────┘
                              │ YES
                              ▼
        ┌─────────────────────────────────────────┐
        │ select random access configuration resource│
        │ related to the two-step random access method│
        │                  (S304)                     │
        └─────────────────────────────────────────┘
                              │
          ┌───────────────────▼─────────────────────┐
          │        transmit a first message (S305)   │
          └──────────────────────────────────────────┘
```

──Feedback type I ────────────┬──────── Feedback type II ────────
                     Feedback type III

| detect no random access feedback (S306) | detect fallback random access feedback (S308) | detect successful access feedback (S307) |

| | determine resource block size, transmission block size and modulation and coding scheme of fallback Msg3 (S310) | Perform operations according to information indicated by the successful random access feedback (S309) | transmit the fallback Msg3 (S311)

perform operations according to feedback for the fallback Msg3 (S312)

( End )

[Fig. 4]
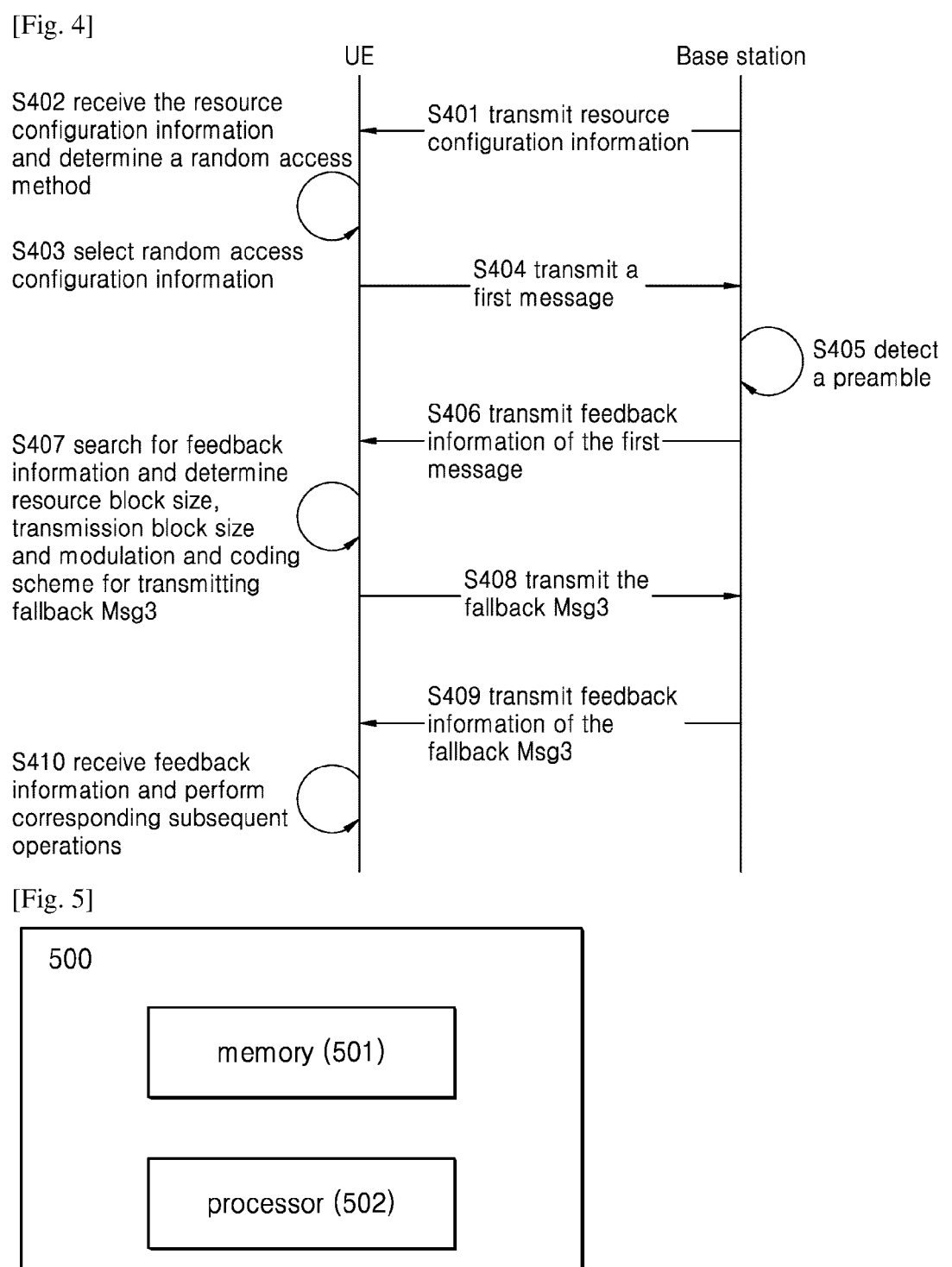
[Fig. 5]

[Fig. 6]

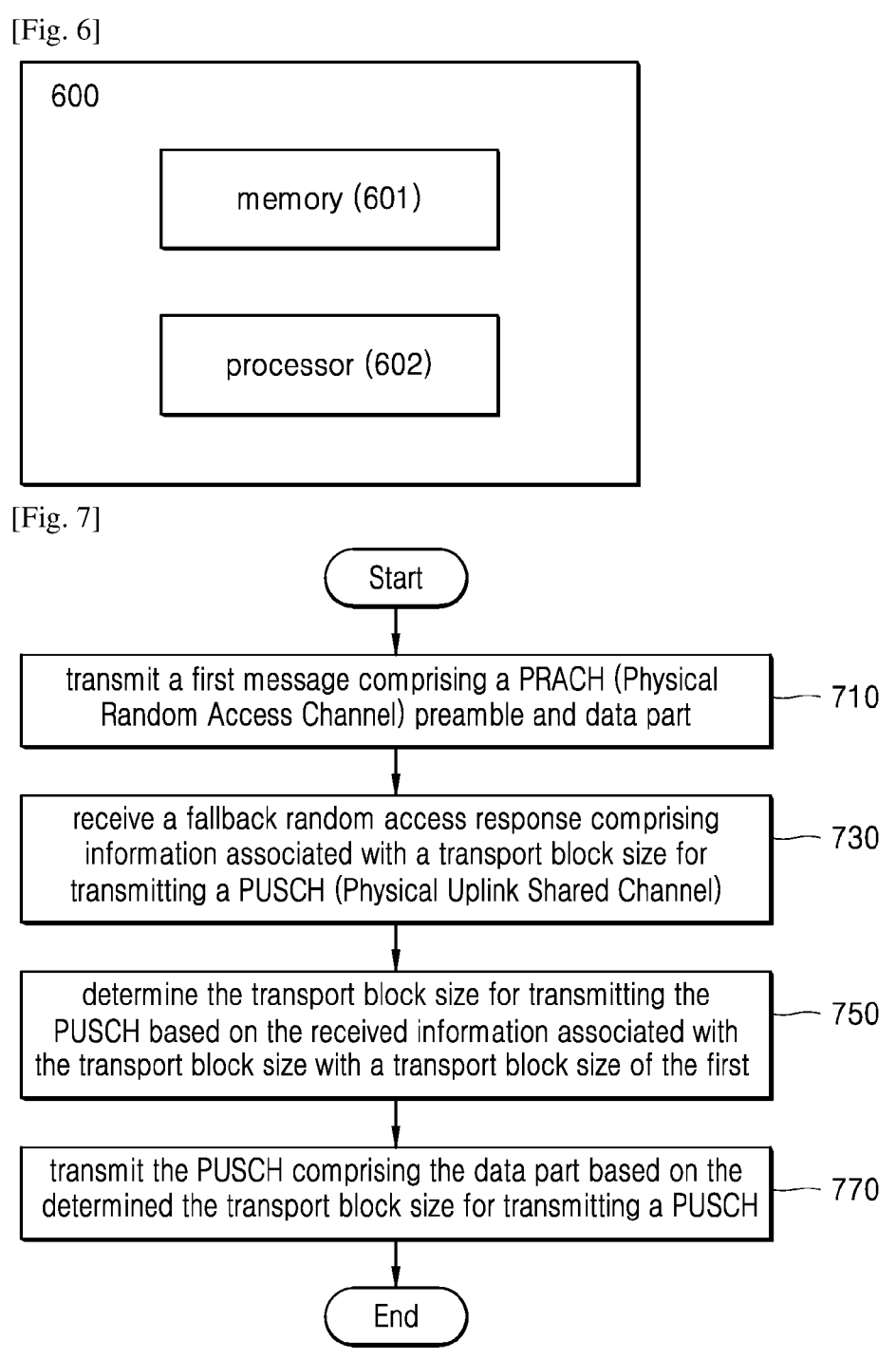

600 memory (601)

processor (602)

[Fig. 7]

Start transmit a first message comprising a PRACH (Physical Random Access Channel) preamble and data part — 710 receive a fallback random access response comprising information associated with a transport block size for transmitting a PUSCH (Physical Uplink Shared Channel) — 730 determine the transport block size for transmitting the PUSCH based on the received information associated with the transport block size with a transport block size of the first — 750 transmit the PUSCH comprising the data part based on the determined the transport block size for transmitting a PUSCH — 770

End

[Fig. 8]

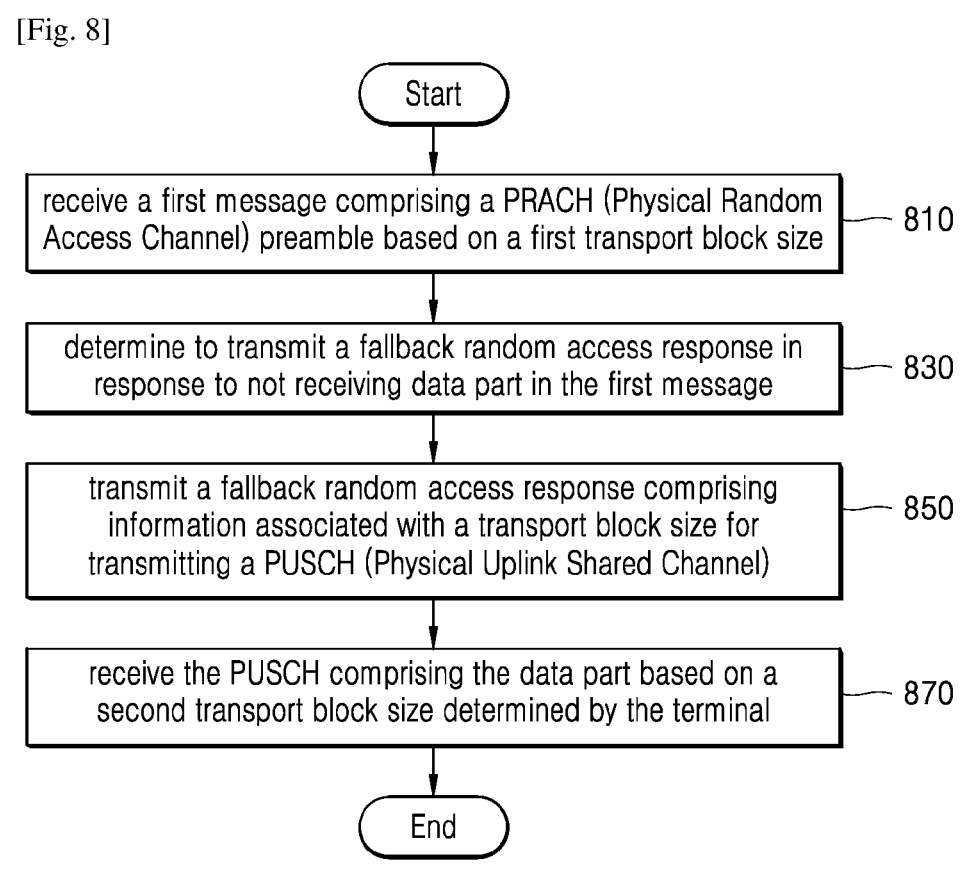

```
                    ┌─────────────┐
                    │    Start    │
                    └──────┬──────┘
                           │
   ┌───────────────────────▼───────────────────────┐
   │ receive a first message comprising a PRACH     │
   │ (Physical Random Access Channel) preamble      │──── 810
   │ based on a first transport block size          │
   └───────────────────────┬───────────────────────┘
                           │
   ┌───────────────────────▼───────────────────────┐
   │ determine to transmit a fallback random        │
   │ access response in response to not receiving   │──── 830
   │ data part in the first message                 │
   └───────────────────────┬───────────────────────┘
                           │
   ┌───────────────────────▼───────────────────────┐
   │ transmit a fallback random access response     │
   │ comprising information associated with a        │──── 850
   │ transport block size for transmitting a PUSCH  │
   │ (Physical Uplink Shared Channel)               │
   └───────────────────────┬───────────────────────┘
                           │
   ┌───────────────────────▼───────────────────────┐
   │ receive the PUSCH comprising the data part     │
   │ based on a second transport block size         │──── 870
   │ determined by the terminal                     │
   └───────────────────────┬───────────────────────┘
                           │
                    ┌──────▼──────┐
                    │     End     │
                    └─────────────┘
```

METHOD AND APPARATUS FOR TRANSMITTING AN UPLINK SIGNAL IN A WIRELESS COMMUNICATION SYSTEM

CROSS-REFERENCE TO RELATED APPLICATIONS

This application is a 371 of International Application No. PCT/KR2020/009847 filed on Jul. 27, 2020, which claims priority to Chinese Patent Application No. 201910681206.8 filed on Jul. 26, 2019, the disclosures of which are herein incorporated by reference in their entirety.

BACKGROUND

1. Field

The present disclosure relates to a wireless communication system technical field, more particularly to a transmission method of an uplink signal and a user equipment using the transmission method.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The present disclosure provides a transmission method of an uplink signal and a user equipment thereof. The transmission method includes: receiving resource configuration information of the uplink signal; determining a random access method to be used; performing a transmission of the uplink signal according to the received resource configuration information of the uplink signal and the determined random access method, wherein the random access method includes a four-step random access method and a two-step random access method.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 is a schematic flowchart of Contention-based Random Access according to embodiments of the present disclosure;

FIG. 2 is a flowchart of a transmission method of an uplink signal according to an exemplary embodiment of the present disclosure;

FIG. 3 is a flowchart of a transmission method of an uplink signal according to another exemplary embodiment of the present disclosure;

FIG. 4 is a schematic flowchart of a transmission method of an uplink signal according to an exemplary embodiment of the present disclosure;

FIG. 5 is a block diagram of a user equipment according to an exemplary embodiment of the present disclosure;

FIG. 6 is a block diagram of a base station according to an exemplary embodiment of the present disclosure;

FIG. 7 illustrates a flow chart illustrating a method performed by a user equipment (UE) in a wireless communication system; and FIG. 8 illustrates a flow chart illustrating a method performed by a base station (BS) in a wireless communication system.

DETAILED DESCRIPTION

Exemplary embodiments of the present disclosure provide a transmission method of an uplink signal and a user equipment, which at least solves the above technical problem and other technical problems not mentioned above, and produces the following advantageous effects.

An aspect of the present disclosure is to provide a transmission method of an uplink signal, which may include: receiving resource configuration information of the uplink signal; determining a random access method to be used; and performing a transmission of the uplink signal according to the received resource configuration information of the uplink signal and the determined random access method, wherein the random access method includes a four-step random access method and a two-step random access method.

The determining the random access method to be used may include: determining a predetermined threshold; generating a random number in a range including the predetermined threshold; comparing the generated random number with the predetermined threshold; and determining the random access method to be used based on a result of the comparing.

Alternatively, the transmission method may also determine the random access method to be used with equal probability.

The performing the transmission of the uplink signal according to the received resource configuration information of the uplink signal and the determined random access method may include at least one of: transmitting a first message based on a preamble and a random access transmission occasion corresponding to the two-step ransom access method and a physical uplink shared channel after determining to use the two-step ransom access method; and performing the transmission of the uplink signal in response to a random access response for the first message.

The performing the transmission of the uplink signal in response to the random access response for the first message may include: if the user equipment does not detect available random access response, retransmitting the first message; if the user equipment detects fallback random access response, transmitting a fallback third message Msg3 according to configuration information indicated by the fallback random access response; and if the user equipment detects successful random access response, the user equipment performs uplink transmission according to uplink scheduling information indicated in the successful random access response, and/or receives downlink data according to downlink scheduling information, and/or performs HARQ-ACK feedback according to PUCCH resource indication.

The transmitting the fallback Msg3 according to the configuration information indicated by the fallback random access response may include: determining a resource block size, a transport block size, and a modulation and coding scheme for the fallback Msg3; and transmitting the fallback Msg3 according to the determined resource block size, transport block size and modulation and coding scheme.

The determining the resource block size, the transport block size, and the modulation and coding scheme for the fallback Msg3 may include at least one of: obtaining at least one of the resource block size, the transport block size, and the modulation and coding scheme for the fallback Msg3 directly according to the configuration information indicated by the fallback random access response; determining at least one of the resource block size, the transport block size, and the modulation and coding scheme for the fallback Msg3 using at least one of a resource block size, a transport block size, and a modulation and coding scheme used when sending the first message; determining whether the user equipment transmits the fallback Msg3 according to at least one of the resource block size, the transport block size, and the modulation and coding scheme notified by the configuration information indicated by the fallback random access response, and/or determining whether a network side needs to combine uplink data in the first message with the fallback Msg3 using at least one of 1-bit explicit indication mode, implicit indication mode and system predefined mode according to the obtained resource configuration information; and obtaining a derived transport block size for the fallback Msg3 according to the configuration information indicated by the fallback random access response.

In the transmission method, the implicit indication mode refers to presetting modulation and coding scheme index values to indicate whether the user equipment transmits the fallback Msg3 according to at least one of the resource block size, the transport block size, and the modulation and coding scheme notified by the configuration information indicated by the fallback random access response, and/or whether the network side needs to combine the uplink data in the first message with the fallback Msg3, respectively.

The determining the resource block size, the transport block size, and the modulation and coding scheme for the fallback Msg3 may further include: when the obtained transport block size is same as the transport block size used by the uplink data in the first message, performing the transmission of the fallback Msg3 according to the obtained transport block size; when the obtained transport block size is greater than the transport block size used by the uplink data in the first message, performing a zero-padding operation on the transport block used by the uplink data in the first message and performing the transmission of the fallback Msg3 according to the obtained transport block size; and when the obtained transport block size is smaller than the transport block size used by the uplink data in the first message, ignoring the transport block size and/or the modulation and coding scheme indicated by the fallback random access response, and determining the modulation and coding scheme according to the transport block size used by the uplink data in the first message and configured resource block size, to perform the transmission of the fallback Msg3.

The transmitting the fallback Msg3 according to the configuration information indicated by the fallback random access response may further include: when only one configuration of the transport block size, the modulation and coding scheme and/or the resource block size available for the fallback Msg3 exists, performing the transmission of the fallback Msg3 according to a result of comparing the transport block size offered in the one configuration and the transport block size used by the uplink data in the first message; and when multiple configurations of the transport block size, the modulation and coding scheme and/or the resource block size available for the fallback Msg3 exist, selecting at least one of the resource block size, the transport block size, and the modulation and coding scheme for the fallback Msg3 according to at least one of the resource block size, the transport block size, and the modulation and coding scheme used by the uplink data in the first message, or informing the network side of the at least one of the resource block size, the transport block size, and the modulation and coding scheme selected by the user equipment through attaching uplink control information to the physical uplink shared channel.

The multiple configurations of the transport block size, the modulation and coding scheme and/or the resource block size available for the fallback Msg3 may include: multiple combinations of the transport block size and/or the modulation and coding scheme and/or the resource block size which are obtained according to the configuration information indicated by the fallback random access response; multiple combinations of the transport block size and/or the modulation and coding scheme and/or the resource block size which are selected from combinations of the transport block size and/or the modulation and coding scheme and/or the resource block size available when sending the first message; and multiple combinations of the transport block size and/or the modulation and coding scheme and/or the resource block size which are derived from preset rules using one combination, wherein the one combination is obtained according to the configuration information indicated by the fallback random access response.

When only the one configuration of the transport block size, the modulation and coding scheme and/or the resource block size available for the fallback Msg3 exists, performing the transmission of the fallback Msg3 may include: when the transport block size offered in the one configuration is smaller than the transport block size used by the uplink data in the first message, ignoring whether the network side needs to combine the uplink data in the first message with the fallback Msg3 and performing the transmission of the fallback Msg3 according to the one configuration; when the transport block size offered in the one configuration is same as the transport block size used by the uplink data in the first message, performing the transmission of the fallback Msg3 according to the one configuration; and when the one transport block size offered in the one configuration is greater than the transport block size used by the uplink data in the first message, performing a zero-padding operation on the transmission block used by the uplink data in the first message and performing the transmission of the fallback Msg3 according to the one configuration.

When the multiple configurations of the transport block size, the modulation and coding scheme and/or the resource block size available for the fallback Msg3 exist, at least one of the following operations may be performed: selecting a combination of the transport block size and/or the modulation and coding scheme and/or the resource block size that can obtain the same transport block size as that used by the uplink data in the first message; selecting a combination of the transport block size and/or the modulation and coding scheme and/or the resource block size that can obtain the transport block size closest to that used by the uplink data in the first message; and selecting a combination of the transport block size and/or the modulation and coding scheme and/or the resource block size that can obtain the transport block size not smaller than and closest to that used by the uplink data in the first message.

Another aspect of the present disclosure is to provide a user equipment which may include a memory and processor. The memory may store a computer-executable instruction therein, which when executed by the processor, performs the following operations: receiving resource configuration information of the uplink signal; determining a random access method to be used; and performing a transmission of the uplink signal according to the received resource configuration information of the uplink signal and the determined random access method, wherein the random access method includes a four-step random access method and a two-step random access method.

The computer-executable instruction, when executed by the processor, may further perform the following operations: generating a random number in a range including the determined predetermined threshold; comparing the generated random number with the predetermined threshold; and determining the random access method to be used based on a result of the comparing.

Alternatively, the computer-executable instruction, when executed by the processor, may also determine the random access method to be used with equal probability.

The computer-executable instruction, when executed by the processor, may further perform the following operations: transmitting a first message based on a preamble and a random access transmission occasion corresponding to the two-step ransom access method and a physical uplink shared channel after determining to use the two-step ransom access method; and performing the transmission of the uplink signal in response to a random access response for the first message.

The computer-executable instruction, when executed by the processor, may further perform the following operations: if the user equipment does not detect available random access response, retransmitting the first message; if the user equipment detects fallback random access response, transmitting a fallback third message Msg3 according to configuration information indicated by the fallback random access response; and if the user equipment detects successful random access response, the user equipment performs uplink transmission according to uplink scheduling information indicated in the successful random access response, and/or receives downlink data according to downlink scheduling information, and/or performs HARQ-ACK feedback according to PUCCH resource indication.

The computer-executable instruction, when executed by the processor, may further perform the following operations: determining a resource block size, a transport block size, and a modulation and coding scheme for the fallback Msg3; and transmitting the fallback Msg3 according to the determined resource block size, transport block size and modulation and coding scheme.

The computer-executable instruction, when executed by the processor, may further perform the following operations: obtaining at least one of the resource block size, the transport block size, and the modulation and coding scheme for the fallback Msg3 directly according to the configuration information indicated by the fallback random access response; determining at least one of the resource block size, the transport block size, and the modulation and coding scheme for the fallback Msg3 using at least one of a resource block size, a transport block size, and a modulation and coding scheme used when sending the first message; determining whether the user equipment transmits the fallback Msg3 according to at least one of the resource block size, the transport block size, and the modulation and coding scheme notified by the configuration information indicated by the fallback random access response, and/or determining whether the network side needs to combine the uplink data in the first message with the fallback Msg3 using at least one of 1-bit explicit indication mode, implicit indication mode and system predefined mode according to the obtained resource configuration information; and obtaining a derived transport block size for the fallback Msg3 according to the configuration information indicated by the fallback random access response.

The implicit indication mode refers to presetting modulation and coding scheme index values to indicate whether the user equipment transmits the fallback Msg3 according to at least one of the resource block size, the transport block size, and the modulation and coding scheme notified by the configuration information indicated by the fallback random access response, and/or whether the network side needs to combine the uplink data in the first message with the fallback Msg3, respectively.

The computer-executable instruction, when executed by the processor, may further perform the following operations: when the obtained transport block size is same as the transport block size used by the uplink data in the first message, performing the transmission of the fallback Msg3 according to the obtained transport block size; when the obtained transport block size is greater than the transport block size used by the uplink data in the first message, performing a zero-padding operation on the transmission block used by the uplink data in the first message and performing the transmission of the fallback Msg3 according to the obtained transport block size; and when the obtained transport block size is smaller than the transport block size used by the uplink data in the first message, ignoring the transport block size and/or the modulation and coding scheme indicated by the fallback random access response, and determining the modulation and coding scheme according to the transport block size used by the uplink data in the first message and configured resource block size, to perform the transmission of the fallback Msg3.

The computer-executable instruction, when executed by the processor, may further perform the following operations: when only one configuration of the transport block size, the modulation and coding scheme and/or the resource block size available for the fallback Msg3 exists, performing the transmission of the fallback Msg3 according to a result of comparing the transmission block side offered in the one configuration and the transport block size used by the uplink data in the first message; and when multiple configurations of the transport block size, the modulation and coding scheme and/or the resource block size available for the fallback Msg3 exist, selecting at least one of the resource block size, the transport block size, and the modulation and coding scheme for the fallback Msg3 according to at least one of the resource block size, the transport block size, and the modulation and coding scheme used by the uplink data in the first message, or informing the network side of the at least one of the resource block size, the transport block size, and the modulation and coding scheme selected by the user equipment through attaching uplink control information to the physical uplink shared channel.

The multiple configurations of the transport block size, the modulation and coding scheme and/or the resource block size available for the fallback Msg3 may include: multiple combinations of the transport block size and/or the modulation and coding scheme and/or the resource block size which are obtained according to the configuration information indicated by the fallback random access response; multiple combinations of the transport block size and/or the modulation and coding scheme and/or the resource block size which are selected from combinations of the transport block size and/or the modulation and coding scheme and/or the resource block size available when sending the first message; and multiple combinations of the transport block size and/or the modulation and coding scheme and/or the resource block size which are derived from preset rules using one combination, wherein the one combination is obtained according to the configuration information indicated by the fallback random access response.

The computer-executable instruction, when executed by the processor, may further perform the following operations: when only the one configuration of the transport block size, the modulation and coding scheme and/or the resource block size available for the fallback Msg3 exists, performing the transmission of the fallback Msg3 may include: when the transport block size offered in the one configuration is smaller than the transport block size used by the uplink data in the first message, ignoring whether the network side needs to combine the uplink data in the first message with the fallback Msg3 and performing the transmission of the fallback Msg3 according to the one configuration; when the transport block size offered in the one configuration is same as the transport block size used by the uplink data in the first message, performing the transmission of the fallback Msg3 according to the one configuration; and when the transport block size offered in the one configuration is greater than the transport block size used by the uplink data in the first message, performing a zero-padding operation on the transmission block used by the uplink data in the first message and performing the transmission of the fallback Msg3 according to the one configuration.

The computer-executable instruction, when executed by the processor, may further perform the following operations: when the multiple configurations of the transport block size, the modulation and coding scheme and/or the resource block size available for the fallback Msg3 exist, performing at least one of the following operations: selecting a combination of the transport block size and/or the modulation and coding scheme and/or the resource block size that can obtain the same transport block size as that used by the uplink data in the first message; selecting a combination of the transport block size and/or the modulation and coding scheme and/or the resource block size that can obtain the transport block size closest to that used by the uplink data in the first message; and selecting a combination of the transport block size and/or the modulation and coding scheme and/or the resource block size that can obtain the transport block size not smaller than and closest to that used by the uplink data in the first message.

In one embodiment, a method, performed by a terminal, of transmitting an uplink signal in a wireless communication system is provided. The method may include transmitting a first message comprising a PRACH (Physical Random Access Channel) preamble and data part; receiving a fallback random access response comprising information associated with a transport block size for transmitting a PUSCH (Physical Uplink Shared Channel); determining the transport block size for transmitting the PUSCH based on the received information associated with the transport block size with a transport block size of the first message; and transmitting the PUSCH comprising the data part based on the determined the transport block size for transmitting a PUSCH.

In one embodiment, the determined transport block size for transmitting the PUSCH is determined based on the transport block size indicated by the received information associated with the transport block size, wherein the transport block size indicated by the received configuration information associated with the transport block size is the same as the transport block size of the first message.

In one embodiment, the determining the transport block size for transmitting the PUSCH may include determining the transport block size indicated by the received information associated with the transport block size is different from the transport block size of the first message; and determining the transport block size for transmitting the PUSCH based on a preset rule.

In one embodiment, the determining the transport block size for transmitting the PUSCH based on the preset rule may include when the transport block size indicated by the received information associated with the transport block size is greater than the transport block size of the first message, performing zero-padding on the transport block of the first message and determining a size of the zero-padded the transport block of the first message as the transport block size for transmitting the PUSCH; and when the transport block size indicated by the received information associated with the transport block size is smaller than the transport block size of the first message, determining the transport block size of the first message as the transport block size for transmitting the PUSCH.

In one embodiment, the method may further include when in Idle state or Inactive state, receiving system information including configuration information of the PUSCH; and identifying a bandwidth for the first message based on the configuration information of the PUSCH, wherein the transmitting the first message comprises transmitting the first message based on the identified bandwidth for the first message.

In one embodiment, the method may further include when in RRC connected state, receiving serving cell configuration including uplink configuration; and identifying a bandwidth for the first message based on the uplink configuration, wherein the transmitting the first message comprises transmitting the first message based on the identified bandwidth for the first message.

In another embodiment, a terminal transmitting an uplink signal in a wireless communication system is provided. The terminal may include a transceiver; and at least one processor operably connected to the transceiver, the at least one processor configured to: transmit a first message comprising a PRACH (Physical Random Access Channel) preamble and data part, receive a fallback random access response comprising information associated with a transport block size for transmitting a PUSCH (Physical Uplink Shared Channel), determine the transport block size for transmitting the PUSCH based on the received information associated with the transport block size with a transport block size of the first message, and transmit the PUSCH comprising the data part based on the determined the transport block size for transmitting a PUSCH.

In another embodiment, the determined transport block size for transmitting the PUSCH is determined based on the transport block size indicated by the received information associated with the transport block size; and wherein the transport block size indicated by the received configuration information associated with the transport block size is the same as the transport block size of the first message.

In another embodiment, the at least one processor is further configured to: determine the transport block size indicated by the received information associated with the transport block size is different from the transport block size of the first message, and determine the transport block size for transmitting the PUSCH based on a preset rule.

In another embodiment, the at least one processor is further configured to: when in Idle state or Inactive state, receive system information including configuration information of the PUSCH when the terminal is an idle state or an inactive state, identify a bandwidth for the first message based on the configuration information of the PUSCH, and transmit the first message based on the identified bandwidth for the first message.

In another embodiment, the at least one processor is further configured to: when in RRC connected state, receiving serving cell configuration including uplink configuration, identifying a bandwidth for the first message based on the uplink configuration, and transmitting the first message based on the identified bandwidth for the first message.

In yet another embodiment, a method, performed by a base station, of receiving an uplink signal in a wireless communication system is provided. The method may include receiving a first message comprising a PRACH (Physical Random Access Channel) preamble based on a first transport block size; determining to transmit a fallback random access response in response to not receiving data part in the first message; transmitting a fallback random access response comprising information associated with a transport block size for transmitting a PUSCH (Physical Uplink Shared Channel); and receiving the PUSCH comprising the data part based on a second transport block size determined by the terminal, wherein the second transport block size is the same as the first transport block size.

In yet another embodiment, the method may further include transmitting, to a terminal in an idle state or in an inactive state, system information including configuration information of the PUSCH, wherein the configuration information of the PUSCH comprises a bandwidth configuration for the first message; and wherein the receiving the first message comprises receiving the first message based on the bandwidth configuration for the first message in configuration information of the PUSCH.

In yet another embodiment, the method may further include transmitting, a terminal in an RRC-connected state, serving cell configuration including uplink configuration, wherein the uplink configuration comprises a bandwidth configuration for the first message; and wherein the receiving the first message comprises receiving the first message based on the bandwidth configuration for the first message.

Another aspect of the present disclosure is to provide a computer-readable recording medium on which a computer-executable instruction is stored, which when the computer-executable instruction is executed, can perform the transmission method of the uplink signal described above.

Another aspect of the present disclosure is to provide a computer which includes a readable medium for storing a computer program and a processor, which when the processor executes the computer program, can execute an instruction of the transmission method of the uplink signal described above.

Based on the above described transmission method and user equipment, it is possible to assist the network side (e.g., a base station) to control the number of the user equipments performing the two-step random access and the four-step random access, thereby effectively realizing load balancing, effectively reducing a conflict probability, and rapidly resolving conflicts that have happened, so as to transmit the uplink signal faster.

FIGS. 1 through 8, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

The following description is provided by referring to the figures to help the embodiments of the present disclosure defined by the claims and other equivalents thereof to be comprehensively understood. The description includes various special details to help to understand the present disclosure, however, these details should be regarded as exemplary embodiments. Therefore, it will be understood by those of ordinary skilled in the art that various changes and amendments may be made to those exemplary embodiments described therein without departing from the spirit and scope of the present disclosure. In addition, for clarity and conciseness, the description to the known functions and structures can be omitted.

Those skilled in the art may understand, unless specifically stated, the singular form used herein may include plural form. It should be further understood that the term "including" and "comprising" used in the description of the present disclosure refers to the presence of the described features, integers, steps, operations, elements and/or components, but does not exclude the presence or addition of one or more other features, integers, steps, operations, elements, components, and/or groups thereof. It should be understood that when an element is referred to as being "connected" or "coupled" to another element, it can be directly connected or coupled to the other element, or there may be intermediate elements. Furthermore, "connected" or "coupled" as used herein may include wirelessly connected or wirelessly coupled. The term "and/or", as used herein, includes all or any of the elements and all combinations of one or more of the associated listed items.

The terms including ordinals such as "first", "second" and the like in the present disclosure can be used to describe various elements, but these elements should not be understood to be limited to these terms. These terms are only used to separate one element from the other elements. For example, without departing from the scope of the present disclosure, a first element may be referred to as a second element and vice versa.

The terms "transmit," "receive," and "communicate," as well as derivatives thereof, encompass both direct and indirect communication. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

Those skilled in the art may understand that, unless otherwise defined, all the terms (including technological and scientific terms) used herein have the same meaning as the meaning commonly understood by those ordinary in the field of the present disclosure. It should also be understood that terms such as those defined in a general dictionary should be understood to have meanings consistent with their meanings in the context of the prior art, and unless being specifically defined, the terms should not be interpreted ideally and too formally.

Those skilled in the art can understand that "terminal", "terminal device", "user equipment", or "UE" as used herein indicate both a device including a wireless signal receiver (that is, a device only has a wireless signal receiver without a transmission capability), and a device including receiving and transmitting hardwares (that is, a device having receiving and transmitting hardwares capable of performing two-way communication over a two-way communication link). The device may include cellular or other communication devices, for example, cellular or other communication devices having a single-line display or a multi-line display or without a multi-line display; Personal Communications Services (PCS) which may have abilities to combine voice, data process, fax and/or data communication; a Personal Digital Assistant (PDA) which may include a radio frequency receiver, a beeper, an Internet/Intranet access, a network browser, a notebook, a calendar and/or a Global positioning system (GPS) receiver; and a conventional laptop and/or palmtop computer or other devices, for example, a conventional laptop and/or palmtop computer or other devices having and/or including a radio frequency receiver. The "terminal" and "terminal device", as used herein, may be portable, transportable or installed in vehicles (air, sea and/or land), or may be suitable for and/or configured to operate locally, and/or any other locations on the earth and/or the space in a distributed way. The "terminal" and "terminal device", as used herein, may also be a communication terminal, am Internet terminal, a music/video player terminal, for example, a PDA, a Mobile Internet Device (MID) and/or a mobile phone having a music/video playback function, and may also be a smart TV, a set top box and so on.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this disclosure to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this disclosure to refer to remote wireless equipment that wirelessly accesses a BS, whether the UE is a mobile device (such as a mobile telephone or smartphone) or is normally considered a stationary device (such as a desktop computer or vending machine).

A time domain unit (also called a time unit) in the present disclosure may be an Orthogonal Frequency Division Multiplexing (OFDM) symbol, an OFDM symbol group (consisting of a plurality of OFDM symbols), a time slot, a time slot group (consisting of a plurality of time slots), a sub-frame, a subframe group (consisting of a plurality of sub-frames), a system frame, and a system frame group (consisting of a plurality of system frames). The time domain unit may also be an absolute time unit (such as 1 ms, 1 s and so on). The time domain unit may also be a combination of various granularity, for example, N1 time slots plus N2 OFDM symbols.

A frequency domain unit in the present disclosure may be a subcarrier, a subcarrier group (consisting of a plurality of subcarriers), a resource block (RB) (which may also be called a physical resource block (PRB)), a resource block group (consisting of a plurality of RBs), a bandwidth part (BWP), a bandwidth part group (consisting of a plurality of BWPs), a bandwidth/carrier, and a bandwidth group/carrier group. The frequency domain unit may be an absolute frequency domain unit (such as 1 HZ, 1 kHZ and so on). The frequency domain unit may also be a combination of various granularity, for example, M1 PRBs plus M2 subcarriers.

In the wireless communication system, signal transmission mainly includes: a signal transmission from a base station (eNB) to a user equipment (UE) (which is called a downlink transmission), where a corresponding time slot is called a downlink time slot; and a signal transmission from UE to the base station (which is called an uplink transmission), where the corresponding time slot is called an uplink time slot.

In the downlink transmission of the wireless communication system, the wireless communication system transmits a synchronization signal and a broadcast channel to the user equipment periodically through a synchronization signal/PBCHB block (SSB), wherein the period is an SSB periodicity or an SSB burst periodicity. At the same time, the base station may configure a Physical Random Access Channel (PRACH) configuration period, and configure a certain number of PRACH Transmission Occasion (RO) during the period. RO may also be referred to as a random access occasion and all SSBs can be mapped to the corresponding RO within a mapping period (namely, a certain length of time).

For a New Radio (NR) communication system, before the establishment of wireless resource control, for example, during the procedure of random access, the performance of random access directly affects user experience. In traditional wireless communication systems (such as LTE and LTE-Advanced), the random access procedure is applied to multiple scenarios, such as establishing initial links, cell handover, re-establishing uplinks, and radio resource control (RRC) connection reconstruction etc., and it is divided into Contention-based Random Access and Contention-free Random Access according to whether the user equipment has exclusive preamble sequence resources. In the Contention-based Random Access, when a plurality of user equipment selects a preamble sequence from the same preamble resource pool during the procedure of attempting to establish an uplink, the user equipment may select the same preamble sequence and send it to the base station, thus a conflict resolution mechanism is an important research direction in random access, wherein how to reduce a conflict probability and how to quickly resolve conflicts that has occurred are key indicators that affect the performance of random access.

FIG. 1 is a schematic flowchart of Contention-based Random Access according to embodiments of the present disclosure.

The Contention-based Random Access procedure is divided into four steps, as shown in FIG. 1. At step S101, the user equipment selects a preamble sequence from the pre-amble sequence resource pool at random and sends the selected preamble sequence to the base station. The base station detects a correlation of the received signal, thereby identifying the preamble sequence sent by the user equipment. At step S102, the base station transmits a Random Access Response (RAR) to the user equipment, wherein the RAR includes a random access preamble sequence identifier, a timing advance command determined according to a delay estimation between the user equipment and the base station, a Cell-Radio Network Temporary Identifier (C-RNTI), and Time-frequency resources assigned for the user equipment to perform the next uplink transmission. At step S103, the user equipment sends a third message (Msg3) to the base station according to the information in RAR. Msg3 includes information such as user equipment terminal identity, RRC connection request and the like, and the user equipment terminal identity is unique for the user equipment and serves to resolve conflicts. At step S104, the base station sends a conflict resolution identity to the user equipment, wherein the conflict resolution identity contains the user equipment terminal identity which won in conflict resolution. After the user equipment detects its own user equipment terminal identity, it converts C-RNTI into its unique C-RNTI in the cell, and sends a response signal to the base station, so as to complete the random access procedure and wait for scheduling by the base station. Otherwise, the user equipment will start a new random access procedure after a delay.

For the Contention-free Random Access procedure, since the base station knows the user equipment terminal identity and can assign the preamble sequence to the user equipment, the user equipment, when sending the preamble sequence, has no need to select the preamble sequence at random, but it can use the assigned preamble sequence. After the base station detects the assigned preamble sequence, it may send the corresponding random access response including the timing advance command and uplink resource assignment information etc. After receiving the random access response, the user equipment considers that uplink synchronization has been completed and waits for further scheduling by the base station. Thus, the Contention-free Random Access procedure may only include two steps, i.e., the user equipment sends the preamble sequence to the base station first, and then the base station sends the random access response to the user equipment.

The random access procedure of the wireless communication system (e.g., LTE) may be adapted to the following scenarios: initial access in RRC idle state, re-establishment of an RRC connection, cell handover, a procedure of downlink data arrival in RRC connected state and requiring random access (when uplink is non-synchronized), a procedure of uplink data arrival in RRC connected state and requiring random access (when the uplink is in non-synchronized or there is no physical uplink control channel (PUCCH) resource which is assigned to the scheduling request) and positioning etc.

However, determining whether the user equipment performs the Contention-based Random Access or the Contention-free Random Access only based on whether the user equipment has exclusive preamble sequence resources will cause the base station to not control the number of user equipment accessed, thereby causing the base station load imbalance. In addition, in some wireless communication systems (such as authorized spectrum and/or unauthorized spectrum), in order to achieve faster signal transmission and reception, the random access preamble is considered to be transmitted together with the data part (they are represented as a first message), and then feedback (represented as a second message) from the network side is searched in the downlink channel. However, after the user equipment transmits the first message, when it determines in the feedback of the network side that it is necessary to fall back to the transmission of Msg3 of the Contention-based Random Access, how to determine a resource block size, a transport block size, and a modulation and coding scheme for transmitting Msg3 to complete the fallback of the transmission of Msg3 is also a problem to be solved.

Hereinafter, according to various embodiments of the present disclosure, the transmission method of the uplink signal and the user equipment thereof of the present disclosure will be described by referring to the accompanying figures.

It should be noted that four-step random access in the present disclosure refers to a procedure where a user equipment transmits a preamble to a network side, the network side transmits a random access response to the user equipment, then the user equipment transmits a third message (Msg3) to the network side, and the network side transmits conflict resolution information to the user equipment. Two-step random access refers to a procedure where the user equipment transmits a message including a preamble and a data part to the network side, and the network side transmits feedback of the message to the user equipment.

FIG. 2 is a flowchart of a transmission method of an uplink signal according to an exemplary embodiment of the present disclosure.

Referring to FIG. 2, resource configuration information of the uplink signal is received at step S201. The user equipment may receive the resource configuration information of the uplink signal from network side configured and/or pre-configured information. The received resource configuration information may include at least one of four-step random access configuration information, two-step random access configuration information, downlink beam configuration information, data resource configuration information of two-step random access, and configuration type information and so on.

Specifically, the four-step random access configuration information (namely, conventional random access configuration information) may include at least one of a four-step random access configuration period, a four-step random access occasion time unit index (such as a time slot index, a symbol index, a subframe index and so on), a four-step random access occasion frequency domain unit index (such as a carrier index, a BWP index, a PRB index, a subcarrier index and so on), the number of four-step random access occasions, a four-step random access preamble format (such as a cyclic prefix length, a preamble sequence length and repeat times, a guard interval length, and the used subcarrier interval size etc), the number of the four-step random access preambles, an index of a root sequence, a cyclic shift value, the number of SSBs that can be mapped on one four-step random access occasion (4 step rach occasion, 4STEPRO), one or more channel state information reference signal CSI-RS indexes for the four-step random access, the number of the 4STEPROs mapped by one CSI-RS, and one or more 4STEPROs mapped by one CSI-RS etc. However, the above listed items are only exemplary, the present disclosure is not limited thereto.

Two-step random access configuration information may include at least one of a two-step random access configuration period (P_2STEPRACH), a two-step random access occasion time unit index (such as a time slot index, a symbol index, a subframe index and so on), a two-step random access occasion frequency domain unit index (such as a carrier index, a BWP index, a PRB index, a subcarrier index and so on), the number of two-step random access occasions, a two-step random access preamble format (such as a cyclic prefix length, a preamble sequence length and repeat times, a guard interval length, and the used subcarrier interval size etc), the number of the two-step random access preambles, an index of a root sequence, a cyclic shift value, the number of SSBs that can be mapped on one two-step random access occasion (2 step rach occasion, 2STEPRO), one or more CSI-RS indexes for the two-step random access, the number of the 2STEPROs mapped by one CSI-RS, and one or more 2STEPROs mapped by one CSI-RS etc. In particular, if parameters in the above two-step random access configuration information are not configured separately, the user equipment may determine the parameters according to a relative relation with corresponding parameters in the four-step random access configuration information. For example, the user equipment may receive the two-step random access configuration period by a calculation according to the four-step random access configuration period and a predefined or configured extension parameter. However, the above listed items are only exemplary, but the present disclosure is not limited thereto.

The Downlink beam (e.g., SSB and/or CSI-RS) configuration information may include at least one of a downlink beam period size, the number of downlink beams transmitted within one downlink beam period, an index of the downlink beam transmitted within one downlink beam period, a time unit location of the downlink beam transmitted within one downlink beam period, and a frequency domain unit location of the downlink beam transmitted within one downlink beam period etc. However, the above listed items are only exemplary, the present disclosure is not limited thereto.

Data resource configuration information of the two-step random access refers to the resource configuration information of the physical uplink shared channel PUSCH. A PUSCH resource unit consists of a PUSCH time frequency resource unit and a demodulation reference signal DMRS resource unit, and the PUSCH resource unit may include time frequency resource configuration information of PUSCH and DMRS configuration information etc. Here, the time frequency resource configuration information of PUSCH may include at least one of one or more PUSCH time frequency resource unit sizes (that is, a PUSCH time frequency resource size corresponding to a two-step random access preamble, includes M time units and N frequency domain units, if there are multiple PUSCH time frequency resource units, sizes of different PUSCH time frequency resource units may be different, i.e., values of M and/or N will be different as the PUSCH time frequency resource unit is different, where the size of the PUSCH time frequency resource unit may be determined by looking up a table); a time frequency resource configuration period of PUSCH (P_PUSCH); a time unit index of the PUSCH time frequency resource unit (e.g., a time slot index, a symbol index, and a subframe index etc); a time frequency unit index of the PUSCH time frequency resource unit (e.g., a carrier index, a BWP index, a PRB index, and a subcarrier index etc); a time domain initial position of the PUSCH time frequency resource; a frequency domain initial position of the PUSCH time frequency resource; the number of the PUSCH time frequency resource unit (or the number of the PUSCH time frequency resource units on the time domain and/or the number of the PUSCH time frequency resource units on the frequency domain are configured respectively); a PUSCH time frequency resource unit format (such as repeat times, a guide interval GT length, and a guard frequency domain interval GP etc); the number of downlink beams that can be mapped on one PUSCH time frequency resource unit; one or more downlink beam indexes for the two-step random access PUSCH transmission; the number of PUSCH time frequency resource units mapped by one downlink beam; and one or more PUSCH time frequency resource unit indexes mapped by one downlink beam etc. However, the above listed items are only exemplary, the present disclosure is not limited thereto.

The time domain initial position of the PUSCH time frequency resource may be at least one of a time domain interval (namely, N time units) between the PUSCH time frequency resource configured on the network side and the corresponding two-step random access time frequency resource; or a length of time occupied by the PUSCH time frequency resource configured on the network side (namely, M1 time units or M1 resource units of the two-step random access PUSCH (the definition of the resource unit is that a size of a time frequency resource for transmitting a data part of a specific size is composed of predefined X time units and Y frequency domain units)). Or the user equipment uses a first time unit following N (or N+x_id*M1, or N+x_id*M1+delta or N+x_id*M1*X+ delta) time units following the last time unit within a time range of the selected two-step random access time frequency resource as the time domain initial position of the two-step PUSCH time frequency resource corresponding to the selected two-step random access time frequency resource, where x_id may be a RO index or an index t_id on the time frequency of the selected RO, delta may be a predefined or configured additional time unit. However, the above listed items are only exemplary, the present disclosure is not limited thereto.

The time range of the selected two-step random access time frequency resource may be at least one of directly selected two-step random access time frequency resource (e.g., the selected RO); a random access time slot where the selected two-step random access time frequency resource is located or the last RO in the time domain thereof; a random access configuration period where the selected two-step random access time frequency resource is located or the last RO in the time domain thereof a mapping circle from the downlink beam to the random access resource where the selected two-step random access time frequency resource is located or the last RO in the time domain thereof an association period from the downlink beam to the random access resource where the selected two-step random access time frequency resource is located or the last RO in the time domain thereof; and an association pattern period from the downlink beam to the random access resource where the selected two-step random access time frequency resource is located or the last RO in the time domain thereof. However, the above listed items are only exemplary, the present disclosure is not limited thereto.

The frequency domain initial position of the PUSCH time frequency resource may be a predefined or configured frequency domain initial position, such as a frequency domain initial position of the two-step random access PUSCH. The frequency domain initial position of the PUSCH time frequency resource is followed by N frequency domain units from a frequency domain location and/or M2 frequency domain units (or the resource units of the two-step random access PUSCH). Here, the frequency domain location may be: a bandwidth part (BWP), a carrier etc; and the frequency domain initial position of the selected two-step random access RO. Or, the user equipment determines that the frequency domain initial position of the two-step random access PUSCH corresponding to the selected RO may be a first frequency domain unit following N (N+x_id*M2, or N+x_id*M2*Y, or N+x_id*M2+delta, or N+x_id*M2*Y+ delta) frequency domain units, where x_id is a frequency domain index of the selected RO, or an RO index, or the selected preamble index (the preamble index on the whole RO or the preamble index available for the two-step random access, for example, the preamble index on the whole RO is 0-63, and the preamble index available for the two-step random access is 54-63, thus x_id here may be 0-9), particularly, N may be 0, where one of the functions of delta is to protect the carrier and avoid the interference between carriers. In particular, the time domain initial position of the time frequency resource of the indicated PUSCH is the time domain initial position of the first PUSCH time frequency resource unit, and/or the frequency domain initial position of the time frequency resource of the indicated PUSCH is the frequency domain initial position of the first PUSCH time frequency resource unit. The other time frequency resources corresponding to all two-step random access time frequency resources within the time range of the two-step random access time frequency resource selected by the user equipment are sequentially derived by a way of frequency domain first and then time domain or time domain first and then frequency domain. However, the above listed items are only exemplary, the present disclosure is not limited thereto.

The DMRS configuration information may include at least one of a number of DMRS ports, indexes of the DMRS ports, DMRS sequence index, or DMRS port configuration information. The DMRS configuration information may include at least one of a number and/or indexes of DMRS ports available on one PUSCH time frequency resource unit (that is, each DMRS port includes its own port configuration information correspondingly) and/or DMRS sequence index (i.e., scrambling ID etc); and DMRS port configuration information. The DMRS port configuration information may include at least one of sequence type, such as a ZC (Zadoff-Chu) sequence or a gold sequence etc; a cyclic shift interval; a length (i.e., subcarriers occupied by DRMS sequence); a Time Domain Orthogonal Cover Code (TD-OCC), for example, TD-OCC having a length of 2 may be [+1, −1], and [−1, +1]; a Frequency Domain Orthogonal Cover Code (FD-OCC), for example, FD-OCC having a length of 2 may be [+1, −1], and [−1, +1]; and a comb configuration including a comb size and/or comb offset, for example, the comb size is 4, if the comb offset is 0, it means the 0th RE of every four REs of the DMRS sequence, and if the comb offset is 1, it means the first RE of every four REs of the DMRS sequence. However, the above listed items are only exemplary, but the present disclosure is not limited thereto.

As for the data resource configuration information of the two-step random access, the network side may have two possible configuration types:

UE obtains the configured data resource of the two-step random access through the separate two-step random access data resource configuration information on the network side, and then the UE can obtain a mapping relation of the random access resource and the data resource through the defined mapping parameter and/or rules of the random access resource and the data resource; and the network side obtains the configured data resource of the two-step random access and the mapping relation between the random access resource and the data resource by configuring the random access resource of the two-step random access, and then configuring a relative time frequency relation (e.g., time domain and/or frequency domain intervals) between the data resource of the two-step random access and the random access resource of the two-step random access and/or defining mapping parameters and/or rules of the random access resource and the data resource.

The above resource configuration information is only exemplary, but not limited thereto. It is possible to add new resource configuration information according to specific circumstances or omit at least one of the above resource configuration information.

The user equipment may obtain all or partial the above resource configuration information based on at least one of: a random access response RAR of the random access procedure, for example, uplink scheduling (UL grant) information in RAR; downlink control information for scheduling an uplink transmission, for example, the uplink scheduling (UL grant) information in downlink control information or separate DCI configuration, wherein the scheduled uplink transmission may be a new transmission of data or retransmission of data; a higher layer control signaling such as a system message transmitted by the network side or RRC configuration message obtained by the user equipment; and pre-configured parameter information etc.

For example, the time frequency resource configuration information of PUSCH may be obtained through the system message, while the DMRS configuration information may be obtained through the RRC configuration information of the user equipment. In particular, the user equipment may obtain a kind of transmission resource configuration for the two-step random access through the system message, may obtain another kind of transmission resource configuration for the two-step random access when the user equipment is in a connected state through user equipment specific RRC configuration information. For example, in the transmission resource of the two-step random access of the system information configuration, the DMRS resource only includes a DMRS port and uses a preset DMRS sequence (e.g., a preset scrambling ID), while the user equipment specific RRC configuration information may configure the DMRS resource to include a DMRS port and a DMRS sequence (e.g., a plurality of different scrambling IDs). Likewise, this way can be used to configure a specific power control parameter for the connected state to adjust PUSCH transmission power of the first message when the user equipment performs the two-step random access in the connected state. However, the above example is only exemplary, but the present disclosure is not limited thereto.

Further, for example, the user equipment may obtain mapping information from an uplink beam to RO (including a four-step random access RO and/or two-step random access RO) based on the above resource configuration information. As an example of SSB, the mapping information may include at least one of a mapping period of SSB to RO (for example, the number of random access configuration periods required to complete at least one mapping of SSB to RO); and a mapping pattern period of SSB to RO (for example, a length of time ensuring that the mapping from SSB to RO in two adjacent mapping pattern periods is complete the same, such as the number of required mapping periods of SSB to RO or the number of required random access configuration periods). Similarly, the user equipment may obtain the mapping information of CSI-RS to RO based on the above resource configuration information, and the mapping information may include at least one of: a mapping period of CSI-RS to RO (for example, the number of random access configuration periods required to complete at least one mapping of all CSI-RSs to RO in the CSI-RS period); and a mapping pattern period of CSI-RS to RO (for example, a length of time ensuring that the mapping from CSI-RS to RO in two adjacent mapping pattern periods is complete the same, such as the number of required mapping periods of CSI-RS to RO or the number of required random access configuration periods). However, the above example is only exemplary, but the present disclosure is not limited thereto.

According to the embodiments of the present disclosure, for determining the resource configuration of the two-step random access, the user equipment may also need to determine a mapping relation between the random access resource of the two-step random access and the data resource of the two-step random access, wherein the mapping relation may include at least one of: a mapping period of the random access resource of the two-step random access and the data resource of the two-step random access; and a mapping rule of the random access resource of the two-step random access and the data resource of the two-step random access, for example, mapping parameters of the random access resource to the data resource and so on. However, the present disclosure is not limited thereto.

A random access method to be used is determined at step S202. According to the above received resource configuration information, the user equipment may obtain four-step random access configuration information and two-step random access configuration information simultaneously, at this time the user equipment needs to determine whether to use the four-step random access method or the two-step random access method.

For example, the user equipment may generate a random number X in a range from T1 to T2 with equal probability according to a predetermined threshold T set in the network side (where $T1 <= T <= T2$). If X is greater than T, the user equipment determines to employ the two-step random access method, and if X is not greater than T, the user equipment may determine to employ the four-step random access method. For example, the base station can configure (or predefine) a predetermined threshold between 0 and 1 through the system information, e.g., T=0.7, the user equipment may generate a random number X between 0 and 1 with equal probability, when X is greater than T (e.g., X=0.8), the user equipment may determine to employ the two-step random access method, and when X is smaller than T (e.g., X=0.4), the user equipment may determine to employ the four-step random access method. Alternatively, it is possible to define that when X is not smaller than T, the user equipment determines to employ the four-step random access method, and if X is smaller than T, the user equipment may determine to employ the two-step random access method.

By setting the predetermined threshold T, the base station can control the number of the user equipment of the two-step random access or the four-step random access, thereby effectively performing load balancing, for example, when T=0.7, from the perspective of probability, 70% of user equipments can be assigned to the four-step random access, and 30% of user equipments can be assigned to the two-step random access.

Alternatively, the user equipment may also randomly select to employ the four-step random access or the two-step random access method with equal probability. However, the above example is only exemplary, but the present disclosure is not limited thereto.

The transmission of the uplink signal is performed according to the received resource configuration information of the uplink signal and the determined random access method at step S203. Specifically, above all, after determining whether to employ the four-step random access or the two-step random access method, the user equipment may obtain random access configuration information corresponding to the determined random access method from the above resource configuration information. For example, after determining to perform the two-step random access, the user equipment may obtain a preamble and RO corresponding to the two-step random access method from the above obtained resource configuration information, and then find available PUSCH resources (such as PUSCH time frequency resource and DMRS resource) through the mapping relation. If N (where N>1) PUSCH resources are found, the user equipment may select one PUSCH resource from the N PUSCH resources to perform the corresponding PUSCH transmission. Next, the user equipment may use the obtained preamble and random access transmission occasion as well as a physical uplink shared channel to transmit a first message to the network side (e.g., the base station), and in response to the random access response on the first message by the network side, perform the transmission of the uplink signal.

According to the embodiments of the present disclosure, after transmitting the first message, the user equipment searches possible random access response on the configured or preset downlink control channel resources, and then performs different operations according to a type of the received feedback. Specifically, if the user equipment cannot detect the available random access response, the first message is retransmitted. For example, the user equipment does not detect the available random access response in a specific case (including a case where the user equipment does not detect the downlink control information, or a case where the user equipment detects the downlink control information but does not detect matched feedback information in the downlink shared channel scheduled by the downlink control information (e.g., there is no matched preamble sequence and/or no a matched user equipment terminal identity or conflict resolution identity) and so on), in this case, the user equipment retransmits the first message.

If the user equipment detects successful random access response, it performs transmission of the uplink signal. For example, when detecting the successful random access response, the user equipment may perform the uplink transmission according to uplink scheduling information indicated in the random access response, and/or receive downlink data according to downlink scheduling information, and/or perform HARQ-ACK feedback according to PUCCH resource indication.

If the user equipment detects fallback random access response, it transmits a fallback Msg3 according to configuration information indicated by the fallback random access response. In this case, it is necessary to determine a resource block size, a transport block size, and a modulation and coding scheme of the fallback Msg3, and then transmit the fallback Msg3 according to the determined resource block size, transport block size and modulation and coding scheme.

In the determining the resource block size, the transport block size, and the modulation and coding scheme for the fallback Msg3, it is possible to obtain at least one of the resource block size, the transport block size, and the modulation and coding scheme for the fallback Msg3 according to the configuration information indicated by the fallback random access response. Specifically, the user equipment can always obtain the resource block size (a size and/or location of the time frequency resource) and/or transport block size and/or modulation and coding scheme according to the configuration information indicated by the fallback random access response. In particular, the user equipment may also obtain any two of the resource block size, the transport block size, and the modulation and coding scheme for the fallback Msg3 directly according to the configuration information indicated by the fallback random access response, and then derive another one of the resource block size, the transport block size, and the modulation and coding scheme for the fallback Msg3 according to the directly obtained two of the resource block size, the transport block size, and the modulation and coding scheme. For example, according to the resource block size, and the modulation and coding scheme directly informed by the configuration information indicated by the fallback random access response, the user equipment may calculate a transmittable transport block size according to the given modulation and coding scheme within the given time frequency resource size.

In the determining the resource block size, the transport block size, and the modulation and coding scheme for the fallback Msg3, it is also possible to use at least one of a resource block size, a transport block size, and a modulation and coding scheme used when sending the first message to determine at least one of the resource block size, the transport block size, and the modulation and coding scheme for the fallback Msg3. Specifically, the user equipment may always use the same resource block size (the size and/or location of the time frequency resource) and/or the same transport block size and/or the same modulation and coding scheme as those used to transmit the first message to determine the resource block size and/or the transport block size and/or the modulation and coding scheme for the fallback Msg3. In particular, when a configuration of one of the resource block size, the transport block size, and the modulation and coding scheme is the same as the corresponding configuration used by the previously transmitted first message, and another one of the resource block size, the transport block size, and the modulation and coding scheme is obtained from the configuration information indicated by the fallback random access response, the other one of the resource block size, the transport block size, and the modulation and coding scheme can be obtained by a calculation from the former two determined configurations. For example, the user equipment may determine available modulation and coding schemes using the same transport block size as the previous first message and the resource block size obtained through the configuration information indicated by the fallback random access response. In particular, if a modulation order has been set in advance, the user equipment may determine a coding rate, and if the available modulation coding scheme does not have only one configuration, the user equipment may select a modulation and coding scheme with a minimum (or a maximum) coding rate and/or a maximum (or minimum) modulation order from the available modulation and coding scheme. The above example is only exemplary, but the present disclosure is not limited thereto.

In the determining the resource block size, the transport block size, and the modulation and coding scheme for the fallback Msg3, it is also possible to determine whether the user equipment transmits the fallback Msg3 according to at least one of the resource block size, the transport block size, and the modulation and coding scheme notified by the configuration information indicated by the fallback random access response, and/or determine whether the network side needs to combine uplink data in the first message with the fallback Msg3 using at least one of 1-bit explicit indication mode, implicit indication mode and system predefined mode according to the obtained resource configuration information. In the present disclosure, the implicit indication mode refers to presetting modulation and coding scheme index values to indicate whether the user equipment transmits the fallback Msg3 according to at least one of the resource block size, the transport block size, and the modulation and coding scheme notified by the configuration information indicated by the fallback random access response, and/or whether the network side needs to combine the uplink data in the first message with the fallback Msg3, respectively.

Specifically, when the 1-bit explicit indication mode is used, the user equipment may obtain a meaning of 1-bit through at least one of the system information, the user equipment specific RRC control information, the downlink control information, and the random access response. For example, "0" may be set to indicate that the user equipment does not transmit the fallback Msg3 according to at least one of the resource block size, the transport block size, and the modulation and coding scheme notified by the configuration information indicated by the fallback random access response, and/or the network side has no need to combine the uplink data in the sent first message with the fallback Msg3, and "1" may be set to indicate that the user equipment transmits the fallback Msg3 according to at least one of the resource block size, the transport block size, and the modulation and coding scheme notified by the configuration information indicated by the fallback random access response, and/or the network side needs to combine the uplink data in the sent first message with the fallback Msg3. However, the above example is only exemplary, but the present disclosure is not limited thereto.

When the implicit indication mode is used, the above determining can be implemented through one or a group of modulation and coding scheme index values. For example, when the modulation and coding scheme index is configured to be 0, the user equipment does not transmit the fallback Msg3 according to the modulation and coding scheme and/or the transport block size notified by the configuration information indicated by the fallback random access response, and/or the network side has no need to combine the uplink data in the sent first message with the fallback Msg3, and when the modulation and coding scheme index is configured to be any one of other optional values, the user equipment may transmit the fallback Msg3 according to the modulation and coding scheme and/or the transport block size notified by the configuration information indicated by the fallback random access response, and/or the network side needs to combine the uplink data in the sent first message with the fallback Msg3.

In particular, the operation may also be applied to network side (e.g., a base station device) to notify whether the user equipment continues the Msg3 transmission of portable data (for example, it can be determined through a specific transport block size/modulation and coding scheme table) or directly falls back to the traditional Msg3 transmission (i.e., determines the transport block size/modulation and coding scheme in a traditional way, for example, it can be determined through a traditional transport block size/modulation and coding scheme table). The modes (i.e., the implicit indication mode or explicit indication mode) may be indicated by a signal in the random access response (e.g., indicated when performing the fallback Msg3 transmission for the first time). Or the modes (i.e., the implicit indication mode or explicit indication mode) may be indicated in PDCCH for scheduling Msg3 retransmission transmitted by the base station device after the user equipment performs the transmission of Msg3 of the portable data N (N>1) times.

In the determining the resource block size, the transport block size, and the modulation and coding scheme for the fallback Msg3, it is also possible to obtain a derived transport block size for the fallback Msg3 according to the configuration information indicated by the fallback random access response, or it is possible to derive the transport block size for the fallback Msg3 according to the obtained resource block size and the modulation and coding scheme.

In addition, after the transport block size is obtained (including the directly obtained or derived transport block size), when the obtained transport block size is same as the transport block size used by uplink data in the first message, the transmission of the fallback Msg3 is performed according to the obtained transport block size. For example, when the obtained transport block size is same as the transport block size used by the uplink data in the sent first message, the user equipment may perform the transmission according to the value of the obtained transport block size. When the obtained transport block size is greater than the transport block size used by the uplink data in the first message, a zero-padding operation may be performed on the transmission block used by the uplink data in the first message and the transmission of the fallback Msg3 may be performed according to the obtained transport block size. For example, when the obtained transport block size is greater than the transport block size used by the uplink data in the sent first message, the user equipment may perform the transmission according to the obtained transport block size and zero-pad the transmission block used by the uplink data in the sent first message (for example, pad delta zeros, where delta is a difference between the obtained transport block size and the transport block size used by the uplink data in the first message). In particular, random redundancy bits, i.e., delta redundancy bits, can be padded, to serve for virtual Cyclic Redundancy Check (CRC). When the obtained transport block size is smaller than the transport block size used by the uplink data in the first message, the transport block size and/or modulation and coding scheme indicated by the fallback random access response are ignored, the modulation and coding scheme is determined according to the transport block size used by the uplink data in the first message and configured resource block size, to perform the transmission of the fallback Msg3. For example, when the obtained transport block size is smaller than the transport block size used by the uplink data in the sent first message, the user equipment may consider this an error configuration, does not expect to receive such a configuration, or ignores the modulation and coding scheme and/or transport block size indicated in the fallback random access response, thus determines the available modulation and coding scheme according to the transport block size used by the uplink data in the sent first message and the configured resource block size. In particular, if a modulation order has been set in advance, the user equipment may determine a coding rate, and if the available modulation coding scheme have various configurations, the user equipment may select a modulation and coding scheme with a minimum (or a maximum) coding rate and/or a maximum (or minimum) modulation order or closest to the configured modulation and coding scheme from the various available modulation and coding schemes.

Determining whether the user equipment transmits the fallback Msg3 according to at least one of the resource block size, the transport block size, and the modulation and coding scheme notified by the configuration information indicated by the fallback random access response, and/or whether the network side needs to combine the uplink data in the first message with the fallback Msg3 can achieve the following (but not limited to) scenarios: the user equipment determines by the above method or a system predefined method that the network side needs to combine the uplink data in the sent first message with the fallback third message. By receiving the first message, the network side can determine the transport block size used by the user equipment for data transmission of the first message. For example, the two-step random access method only supports one modulation and coding scheme and/or transport block size, according to preamble packets in the first message, different packets correspond to different transport block sizes, or according to the transport block size indicated by uplink control information UCI carried on PUSCH, the network side may know the transport block size used by the user equipment for transmitting data through the detected preamble or correctly decoded UCI, even if PUSCH decoding fails.

In the determining the resource block size, the transport block size, and the modulation and coding scheme for the fallback Msg3, when only one configuration of the transport block size, the modulation and coding scheme and/or the resource block size available for the fallback Msg3 exists, the transmission of the fallback Msg3 is performed according to a result of comparing the transport block size offered in the one configuration and the transport block size used by the uplink data in the first message. Specifically, when the transport block size offered in the one configuration is smaller than the transport block size used by the uplink data in the first message, whether the network side needs to combine the uplink data in the first message with the fallback Msg3 is ignored and the transmission of the fallback Msg3 is performed according to the one configuration. When the transport block size offered in the one configuration is same as the transport block size used by the uplink data in the first message, the transmission of the fallback Msg3 is performed according to the one configuration. When the transport block size offered in the one configuration is greater than the transport block size used by the uplink data in the first message, a zero-padding operation is performed on the transmission block used by the uplink data in the first message and the transmission of the fallback Msg3 is performed according to the one configuration.

For example, when the only one existing configuration available for the fallback Msg3 offers a transport block size which is not same as or smaller than the transport block size used by the user equipment for the uplink data in the sent first message, the user equipment may consider that this configuration is an error configuration. In this case, the user equipment does not expect to receive such configuration, the user equipment behavior is undefined, the user equipment may prepare to transmit the fallback Msg3 according to this configuration, and ignore whether the network side (for example, the base station) needs to combine the uplink data in the sent first message with the fallback Msg3. When the transport block size in the only one existing configuration available for fallback Msg3 is same as the transport block size used by the user equipment for the uplink data in the sent first message, the user equipment may prepare to transmit the fallback Msg3 according to this configuration. When the transport block size in the only one existing configuration available for fallback Msg3 is greater than the transport block size used by the user equipment for the uplink data in the sent first message, the user equipment may consider that this configuration is an error configuration, and does not expect to receive such configuration, the user equipment behavior is undefined, the user equipment may prepare to transmit the fallback Msg3 according to this configuration, and zero-pad the transmission block used by the uplink data in the sent first message (for example, pad delta zeros, where delta is a difference between the obtained transport block size and the transport block size used by the uplink data in the first message) to the transport block size of this configuration, thereafter perform the transmission. In particular, random redundancy bits, i.e., delta redundancy bits, can be padded, to serve for virtual Cyclic Redundancy Check (CRC).

The following (but not limited to) scenarios can be achieved by considering that only one configuration (combination) exists: the user equipment determines from the above method or a system predefined method that the network side needs to combine the uplink data in the sent first message with the fallback Msg3, and the network side knows that the user equipment is transmitting the data by receiving the first message, but cannot determine the transport block size or modulation and coding scheme used by the user equipment.

In the determining the resource block size, the transport block size, and the modulation and coding scheme for the fallback Msg3, when multiple configurations of the transport block size, the modulation and coding scheme and the resource block size available for the fallback Msg3 exist, the user equipment may select at least one of the resource block size, the transport block size, and the modulation and coding scheme for the fallback Msg3 according to at least one of the resource block size, the transport block size, and the modulation and coding scheme used by the uplink data in the first message, or inform the network side of the at least one of the resource block size, the transport block size, and the modulation and coding scheme selected by the user equipment by attaching uplink control information to the physical uplink shared channel.

Here, the multiple configurations (combinations) of the transport block size, the modulation and coding scheme and/or the resource block size available for the fallback Msg3 may include: multiple combinations of the transport block size and/or the modulation and coding scheme and/or the resource block size which are obtained according to the configuration information indicated by the fallback random access response, multiple combinations of the transport block size and/or the modulation and coding scheme and/or the resource block size which are selected from combinations of the transport block size and/or the modulation and coding scheme and/or the resource block size available when sending the first message, and multiple combinations of the transport block size and/or the modulation and coding scheme and/or the resource block size which are derived from preset rules using one combination, wherein the one combination is obtained according to the configuration information indicated by the fallback random access response. For example, the multiple configurations available for the fallback Msg3 may include (but not limited to): multiple combinations of the transport block size and/or the modulation and coding scheme and/or the resource block size which are obtained through the configuration information indicated by the fallback random access response; or combinations of the transport block size and/or the modulation and coding scheme and/or the resource block size selectable when reusing the sent first message, that is, the user equipment may select the multiple combinations of the transport block size and/or the modulation and coding scheme and/or the resource block size when transmitting the first message, and may also select from the same multiple combinations of the transport block size and/or the modulation and coding scheme and/or the resource block size when performing the transmission of the fallback Msg3 after receiving the fallback random access response indication; and a combination of the transport block size and/or the modulation and coding scheme and/or the resource block size which is obtained through the configuration information indicated by the fallback random access response; and available multiple combinations of the transport block size and/or the modulation and coding scheme and/or the resource block size which are obtained through the preset rules, for example, when being informed of a supportable combination of the maximum (or minimum) transport block size and/or the maximum (or minimum) modulation and coding scheme and/or the maximum (or minimum) resource block size, the user equipment may determine other available combinations in proportion. For example, the base station indicates in the configuration information indicated by the fallback random access response that the resource block size is one physical resource block PRB, but the user equipment may support 4 times the resource block size, i.e., the user equipment may select the resource block size such as one PRB, two PRBs, three PRBs and the maximum four PRBs.

After obtaining the multiple available configurations of the transport block size and/or the modulation and coding scheme and/or the resource block size, the user equipment may perform at least one of the following operations: selecting a combination of the transport block size and/or the modulation and coding scheme and/or the resource block size that can obtain the same transport block size as that used by the uplink data in the first message; selecting a combination of the transport block size and/or the modulation and coding scheme and/or the resource block size that can obtain the transport block size closest to that used by the uplink data in the first message; and selecting a combination of the transport block size and/or the modulation and coding scheme and/or the resource block size that can obtain the transport block size not smaller than and closest to that used by the uplink data in the first message. That is, the user equipment may select one from the above multiple configurations (combinations), and the selected configuration (combination) includes the transport block size that is the same or closest to or not smaller than and closest to the transport block size used by the uplink data in the first message.

For example, the user equipment may select a combination of the transport block size and/or the modulation and coding scheme and/or the resource block size that can obtain the same transport block size as that used by the uplink data in the first message which has been sent. Alternatively, the user equipment may select a combination of the transport block size and/or the modulation and coding scheme and/or the resource block size that can obtain the transport block size closest to that used by the uplink data in the first message which has been sent. Alternatively, the user equipment may select a combination of the transport block size and/or the modulation and coding scheme and/or the resource block size that can obtain the transport block size not smaller than and closest to that used by the uplink data in the first message which has been sent.

Besides, the user equipment may also carry the uplink control information in the fallback Msg3 to inform the base station of the selected combination of the transport block size and/or the modulation and coding scheme and/or the resource block size.

The following (but not limited to) scenarios can be achieved by considering that multiple configurations (combinations) exist: the user equipment determines from the above method or a system predefined method that the network side needs to combine the uplink data in the sent first message with the fallback Msg3, and the network side knows that the user equipment is transmitting the data by receiving the first message, but cannot determine the transport block size or modulation and coding scheme used by the user equipment.

The method of determining the transport block size, the resource block size, and the modulation and coding scheme for the fallback Msg3 as described above is only exemplary. According to the above method, at least one of the resource block size, the transport block size, and the modulation and coding scheme can be obtained, and then the resource block size, the transport block size, and the modulation and coding scheme that are not obtained can be calculated or derived according to the obtained at least one of the resource block size, the transport block size, and the modulation and coding scheme. The user equipment may determine the resource block size, the transport block size, and the modulation and coding scheme for the fallback Msg3 using any combination or separately using one of the above methods.

The user equipment searches for possible network feedback information in the configured downlink control search space after transmitting the fallback Msg3. For example, if retransmission scheduling information for the Msg3 is searched, the user equipment performs the retransmission of the Msg3, if conflict resolution information is searched, the user equipment read the conflict resolution information, if the conflict resolution succeeds, the user equipment completes the random access procedure, and if the conflict resolution fails, the user equipment may perform the four-step random access or the two-step random access again.

FIG. 3 is a flowchart of a transmission method of an uplink signal according to another exemplary embodiment of the present disclosure.

Referring to FIG. 3, the user equipment may receive resource configuration information of the uplink signal from network side configured and/or pre-configured information at step S301. The received resource configuration information may include at least one of four-step random access configuration information, two-step random access configuration information, downlink beam configuration information, data resource configuration information of two-step random access, and configuration type information and so on. Content regarding the resource configuration information has been described above, which will be omitted here.

The user equipment determines whether to employ the four-step random access method or the two-step random access method at step S302. Here, four-step random access refers to a procedure where a user equipment transmits a preamble to a network side, the network side transmits a random access response to the user equipment, then the user equipment transmits a third message (Msg3) to the network side, and the network side transmits conflict resolution information to the user equipment. Two-step random access refers to a procedure where the user equipment transmits a message including a preamble and a data part to the network side, and the network side transmits feedback of the message to the user equipment. For example, according to the pre-determined threshold set on the network side, the user equipment may randomly generate a random number with equal probability within a range including the predetermined threshold, and then compare the generated random number with the predetermined threshold, thereby determining whether to employ the four-step random access method or the two-step random access method according to the result of the comparing. Alternatively, the user equipment may also select to employ the four-step random access or the two-step random access method with equal probability. However, the above example is only exemplary, but the present disclosure is not limited thereto. If it is determined to use the four-step random access method, the user equipment proceeds to step S303, the four-step random access method is employed. The four-step random access method here is similar to the Contention-based Random Access. If it is determined to use the two-step random access method, the user equipment proceeds to step S304.

At step S304, random access configuration information corresponding to the two-step random access method is obtained from the obtained resource configuration information. For example, after determining to perform the two-step random access, the user equipment may obtain a preamble and RO corresponding to the two-step random access method from the above obtained resource configuration information, and then find available PUSCH resources (such as PUSCH time frequency resource and DMRS resource) through a mapping relation, if N (where N>1) PUSCH resources are found, the user equipment may select one PUSCH resource from the N PUSCH resources to perform the corresponding PUSCH transmission.

At step S305, the first message is transmitted according to the obtained random access configuration information. The first message here includes not only the preamble but also the data part and so on. In this way, the uplink signal can be transmitted faster. Then the user equipment performs the subsequent operations according to a feedback type for the first message.

At step S306, if the user equipment does not detect available random access response, it returns to step S305 to retransmit the first message.

At step S307, if the user equipment detects successful random access response, it proceeds to step S309 to operate according to information indicated by the successful random access response. For example, the user equipment may perform the uplink transmission according to uplink sched-uling information indicated in the random access response, and/or receive downlink data according to downlink sched-uling information, and/or perform HARQ-ACK feedback according to PUCCH resource indication.

At step S308, if the user equipment detects fallback random access response, it proceeds to step S309.

At step S309, the resource block size, the transport block size, and the modulation and coding scheme for the fallback Msg3 are determined. The user equipment may obtain at least one of the resource block size, the transport block size, and the modulation and coding scheme for the fallback Msg3 directly according to the configuration information indicated by the fallback random access response, or deter-mine at least one of the resource block size, the transport block size, and the modulation and coding scheme for the fallback Msg3 by using at least one of a resource block size, a transport block size, and a modulation and coding scheme used when sending the first message, or obtain a derived transport block size for the fallback Msg3 according to the configuration information indicated by the fallback random access response. In addition, by using at least one of 1-bit explicit indication mode, implicit indication mode and sys-tem predefined mode according to the obtained resource configuration information, the user equipment may also determine whether the user equipment transmits the fallback Msg3 according to at least one of the resource block size, the transport block size, and the modulation and coding scheme notified by the configuration information indicated by the fallback random access response, and/or determine whether the network side needs to combine the uplink data in the first message with the fallback Msg3. In particular, the operation may also be applied to network side (e.g., a base station device) to notify whether the user equipment continues the Msg3 transmission of portable data (for example, it can be determined through a specific transport block size/modula-tion and coding scheme table) or directly falls back to the traditional Msg3 transmission (e.g., determines the transport block size/modulation and coding scheme in a traditional way, for example, it can be determined through a traditional transport block size/modulation and coding scheme table). The modes (i.e., the implicit indication mode or explicit indication mode) may be indicated by a signal in the random access response (i.e., indicated when performing the fall-back Msg3 transmission for the first time), or may be indicated in PDCCH for scheduling Msg3 retransmission transmitted by the base station device after the user equip-ment performs the transmission Msg3 of portable data N (N>1) times.

According to the above method, at least one of the resource block size, the transport block size, and the modu-lation and coding scheme can be obtained, and then the resource block size, the transport block size, and the modu-lation and coding scheme that are not obtained can be calculated or derived according to the obtained at least one of the resource block size, the transport block size, and the modulation and coding scheme. The user equipment may determine the resource block size, the transport block size, and the modulation and coding scheme for the fallback Msg3 using any combination or separately using one of the above methods.

Besides, in the determining the resource block size, the transport block size, and the modulation and coding scheme for the fallback Msg3, when the obtained transport block size is same as the transport block size used by the uplink data in the first message, the user equipment may perform the transmission of the fallback Msg3 according to the obtained transport block size. When the obtained transport block size is greater than the transport block size used by the uplink data in the first message, the user equipment needs to perform a zero-padding operation on the transmission block used by the uplink data in the first message to the size of the obtained transport block size, and perform the transmission of the fallback Msg3 according to the obtained transport block size. When the obtained transport block size is smaller than the transport block size used by the uplink data in the first message, the user equipment may ignore the transport block size and/or modulation and coding scheme indicated by the fallback random access response, and determine the modulation and coding scheme according to the transport block size used by the uplink data in the first message and configured resource block size, so as to perform the trans-mission of the fallback Msg3.

According to the embodiments of the present disclosure, it is also considered that only one configuration of the transport block size, the modulation and coding scheme and/or the resource block size available for the fallback Msg3 exists and multiple configurations of the transport block size, the modulation and coding scheme and/or the resource block size available for the fallback Msg3 exist.

In the case where only one configuration of the transport block size, the modulation and coding scheme and/or the resource block size available for the fallback Msg3 exists, when the transport block size offered in the one configuration is smaller than the transport block size used by the uplink data in the first message, the user equipment may ignore whether the network side needs to combine the uplink data in the first message with the fallback Msg3 and perform the transmission of the fallback Msg3 according to the one configuration. When the transport block size offered in the one configuration is same as the transport block size used by the uplink data in the first message, the user equipment may perform the transmission of the fallback Msg3 directly according to the one configuration. When the transport block size offered in the one configuration is greater than the transport block size used by the uplink data in the first message, the user equipment may perform a zero-padding operation on the transmission block used by the uplink data in the first message and perform the transmission of the fallback Msg3 according to the one configuration.

When the multiple configurations (combinations) of the transport block size, the modulation and coding scheme and/or the resource block size available for the fallback Msg3 exist, the user equipment may select a combination of the transport block size and/or the modulation and coding scheme and/or the resource block size that can obtain the transport block size same as or closest to that used by the uplink data in the first message, or select a combination of the transport block size and/or the modulation and coding scheme and/or the resource block size that can obtain the transport block size not smaller than and closest to that used by the uplink data in the first message.

According to the above method, at least one of the resource block size, the transport block size, and the modulation and coding scheme can be obtained, and then the resource block size, the transport block size, and the modulation and coding scheme that are not obtained can be calculated or derived according to the obtained at least one of the resource block size, the transport block size, and the modulation and coding scheme. The user equipment may determine the resource block size, the transport block size, and the modulation and coding scheme for the fallback Msg3 using any combination or separately using one of the above methods. However, the above example is only exemplary, but the present disclosure is not limited thereto.

After determining the transport block size, the modulation and coding scheme and the resource block size available for the fallback Msg3, the fallback Msg3 is transmitted using the determined transport block size, the modulation and coding scheme and the resource block size at step S311.

At step S312, the user equipment performs an operation according to feedback for the fallback Msg3. For example, the user equipment searches for possible network feedback information in the configured downlink control search space after transmitting the fallback Msg3. For example, if retransmission scheduling information for the Msg3 is searched, the user equipment performs the retransmission of the Msg3, if conflict resolution information is searched, the user equipment read the conflict resolution information, if the conflict resolution succeeds, the user equipment completes the random access procedure, and if the conflict resolution has not been successful, the user equipment may retransmit the first message.

FIG. 4 is a schematic flowchart of a transmission method of an uplink signal according to an exemplary embodiment of the present disclosure. FIG. 4 is a schematic flowchart for the user equipment determining the two-step random access method and transmitting the fallback Msg3.

At step S401, the base station transmits resource configuration information to the user.

At step S402, the user equipment receives the resource configuration information and determines whether to employ the two-step random access method or the four-step random access method. In the present embodiment, it is assumed that the user equipment determines to employ the two-step random access method.

At step S403, the user equipment selects random access configuration information corresponding to the two-step random access method from the received resource configuration information. For example, after determining to perform the two-step random access, the user equipment may obtain a preamble and RO corresponding to the two-step random access method from the above obtained resource configuration information, and then find available PUSCH resources (such as PUSCH time frequency resource and DMRS resource) through a mapping relation.

At step S404, the user equipment transmits the first message to the base station according to the selected random access configuration information. The first message here may include the preamble and the data part etc.

At step S405, the base station detects the preamble for the user equipment on an RO. If no preamble is detected, the base station does not feed back. If the preamble is detected, possible data transmission may be detected on PUSCH corresponding to the preamble through the mapping relation, wherein if the data is correctly decoded, the base station transmits successful feedback information to the user equipment, and if the data is not correctly decoded, the base station transmits fallback random access response to the user equipment. In one embodiment, it is assumed that the base station transmits the fallback random access response to the user equipment. In one embodiment, it is assumed that the fallback random access response is detected.

At step S406, the base station transmits feedback information of the first message to the user equipment.

At step S407, the user equipment searches possible feedback information in a configured search space. If the feedback information of the base station is not detected, or the conflict resolution identity or RAPID in the feedback information does not match, the user equipment may retransmit the first message. If the successful feedback information is detected, the transmission of the uplink signal is performed directly. If the fallback random access response is detected, it is necessary to determine the transport block size, the resource block size, and the modulation and coding scheme for transmitting the fallback Msg3. A method of determining the transport block size, the resource block size, and the modulation and coding scheme for transmitting the fallback Msg3 has been described in detail in FIGS. 2 and 3, which will be omitted here. In one embodiment, it is assumed that the fallback random access response is found.

At step S408, the user equipment transmits the fallback Msg3 to the base station according to the determined transport block size, the resource block size, and the modulation and coding scheme.

At step S409, the base station transmits feedback information of the fallback Msg3 to the user equipment.

At step S410, the user equipment receives the feedback information of the fallback Msg3 and performs the corresponding subsequent operations according to the feedback information of the fallback Msg3. For example, if retransmission scheduling information for the Msg3 is searched, the user equipment performs the retransmission of the Msg3, if conflict resolution information is searched, the user equipment read the conflict resolution information, if the conflict resolution succeeds, the user equipment completes the random access procedure, and if the conflict resolution has not been successful, the user equipment may retransmit the first message.

FIG. 5 is a block diagram of a user equipment (UE) according to an exemplary embodiment of the present disclosure.

Referring to FIG. 5, a user equipment 500 according to the present disclosure may include a memory 501 and a processor 502. In addition, the user equipment 500 may further include a transceiver. However, all of the illustrated components are not essential. The UE 500 may be implemented by more or less components than those illustrated in FIG. 5. In addition, the processor 502 and the transceiver and the memory 501 may be implemented as a single chip according to another embodiment.

The processor 502 may include one or more processors or other processing devices that control the proposed function, process, and/or method. Operation of the UE 500 may be implemented by the processor 502.

The processor 502 may detect a PDCCH on a configured control resource set. The processor 502 determines a method for dividing CBs and a method for rate matching of a PDSCH according to the PDCCH. The processor 502 may control the transceiver to receive the PDSCH according to the PDCCH. The processor 502 may generate HARQ-ACK information according to the PDSCH. The processor 502 may control the transceiver to transmit the HARQ-ACK information.

The transceiver may include a RF transmitter for up-converting and amplifying a transmitted signal, and a RF receiver for down-converting a frequency of a received signal. However, according to another embodiment, the transceiver may be implemented by more or less components than those illustrated in components.

The transceiver may be connected to the processor 502 and transmit and/or receive a signal. The signal may include control information and data. In addition, the transceiver may receive the signal through a wireless channel and output the signal to the processor 502. The transceiver may transmit a signal output from the processor 502 through the wireless channel.

The memory 501 may store the control information or the data included in a signal obtained by the UE 500. The memory 501 may be connected to the processor 502 and store at least one instruction or a protocol or a parameter for the proposed function, process, and/or method. The memory 501 may include read-only memory (ROM) and/or random access memory (RAM) and/or hard disk and/or CD-ROM and/or DVD and/or other storage devices. The memory 501 may store a computer-executable instruction, which when executed by the processor 502, can execute at least one method corresponding to the above respective embodiments of the present disclosure.

Specifically, when the instruction stored in the memory 501 is executed by the processor 502, the instruction can implement the following operations: receiving resource configuration information of an uplink signal; determining a random access method to be used; obtaining random access configuration information corresponding to the determined random access method from the received resource configuration information; and performing the transmission of the uplink signal according to the obtained random access resource configuration information.

Further, the instruction can also implement the operation of how to determine the transport block size, the resource block size, and the modulation and coding scheme for the fallback Msg3 and so on. The instruction is not limited to the above operations. It can also implement steps as described in FIGS. 2 and 3, the specific description will be omitted here.

FIG. 6 is a block diagram of a base station (BS) according to an exemplary embodiment of the present disclosure.

Referring to FIG. 6, a base station 600 may include a memory 601 and a processor 602. The base station 600 may further include a transceiver. However, all of the illustrated components are not essential. The base station 600 may be implemented by more or less components than those illustrated in FIG. 6. In addition, the processor 602 and the transceiver and the memory 601 may be implemented as a single chip according to another embodiment The gNBs, eNBs or BSs described above may correspond to the base station 600.

The processor 602 may include one or more processors or other processing devices that control the proposed function, process, and/or method. Operation of the base station 600 may be implemented by the processor 602.

The processor 602 may detect a PUCCH on a configured control resource set. The processor 602 determines a method for dividing CBs and a method for rate matching of a PUSCH according to the PUCCH. The processor 602 may control the transceiver to receive the PUSCH according to the PUCCH. The processor 602 may generate HARQ-ACK information according to the PUSCH. The processor 602 may control the transceiver to transmit the HARQ-ACK information.

The transceiver may include a RF transmitter for up-converting and amplifying a transmitted signal, and a RF receiver for down-converting a frequency of a received signal. However, according to another embodiment, the transceiver may be implemented by more or less components than those illustrated in components.

The transceiver may be connected to the processor 602 and transmit and/or receive a signal. The signal may include control information and data. In addition, the transceiver may receive the signal through a wireless channel and output the signal to the processor 602. The transceiver may transmit a signal output from the processor 602 through the wireless channel.

The memory 601 may store the control information or the data included in a signal obtained by the BS 600. The memory 601 may be connected to the processor 602 and store at least one instruction or a protocol or a parameter for the proposed function, process, and/or method. The memory 601 may include read-only memory (ROM) and/or random access memory (RAM) and/or hard disk and/or CD-ROM and/or DVD and/or other storage devices. The memory 601 may store a computer-executable instruction, which when executed by the processor 602, can for example transmit resource configuration information of an uplink signal to the user equipment 500 to provide a user equipment with random access configuration information, can detect a preamble for the user equipment on the RO and transmit the feedback information of the first message to the user equipment 500, and transmit the feedback information of the fallback Msg3 to the user equipment 500 so that the user equipment 500 can perform subsequent processes according to response information of the base station 600. However, the above example is only exemplary, the present disclosure is not limited thereto.

The present disclosure also provides a computer-readable recording medium on which a computer-executable instruction is stored, which when the computer-executable instruction is executed, can perform any method of the embodiments of the present disclosure. Specifically, for example, the instruction may be configured to transmit resource configuration information (the resource configuration information is the same as mentioned above, which will be omitted here) to the user equipment 500, determine the random access method, select random access configuration information, transmit the first message to the base station 600, detect possible random access preamble information on the configured random access occasion, determine whether to transmit the fallback Msg3, or detect an uplink signal transmitted by the user equipment on an uplink transmission resource configured on the network side. However, the above example is only exemplary, but the present disclosure is not limited thereto.

The transmission method of the uplink signal and the user equipment described in the present disclosure can assist the network side (e.g., a base station) to control the number of user equipments performing the two-step random access and the four-step random access, thereby effectively realizing load balancing, effectively reducing a contention probability, and rapidly resolving the conflicts that has happened. For example, in the two-step random access, a need of falling back to the transmission of a third message Msg3 in the four-step random access is detected, it is possible to determine the resource block size, the transport block size, and the modulation and coding scheme for the fallback Msg3 to complete the transmission of the fallback Msg3, thereby performing the transmission of the uplink signal more rapidly and effectively.

FIG. 7 illustrates a flow chart illustrating a method performed by a user equipment (UE) in a wireless communication system.

Referring to FIG. 7, in operation 710, the UE may transmit a first message comprising a PRACH (Physical Random Access Channel) preamble and data part. In order to achieve faster signal transmission and reception, the random access preamble is considered to be transmitted together with the data part (they are represented as a first message), and then feedback (represented as a second message) from the network side is searched in the downlink channel.

In operation 730, the UE may receive a fallback random access response comprising information associated with a transport block size for transmitting a PUSCH (Physical Uplink Shared Channel).

According to the embodiments of the present disclosure, after transmitting the first message, the user equipment searches possible random access response on the configured or preset downlink control channel resources, and then performs different operations according to a type of the received feedback. Specifically, if the user equipment does not detect the available random access response, the first message is retransmitted. For example, the user equipment does not detect the available random access response in a specific case (including a case where the user equipment does not detect the downlink control information, or a case where the user equipment detects the downlink control information but does not detect matched feedback information in the downlink shared channel scheduled by the downlink control information (e.g., there is no matched preamble sequence and/or no a matched user equipment terminal identity or conflict resolution identity) and so on), in this case, the user equipment retransmits the first message.

If the user equipment detects successful random access response, it performs transmission of the uplink signal. For example, when detecting the successful random access response, the user equipment may perform the uplink transmission according to uplink scheduling information indicated in the random access response, and/or receive downlink data according to downlink scheduling information, and/or perform HARQ-ACK feedback according to PUCCH resource indication.

In operation 750, the UE may determine the transport block size for transmitting the PUSCH based on the received information associated with the transport block size with a transport block size of the first message.

If the user equipment detects fallback random access response, it transmits a fallback Msg3 according to configuration information indicated by the fallback random access response. In this case, it is necessary to determine a resource block size, a transport block size, and a modulation and coding scheme of the fallback Msg3, and then transmit the fallback Msg3 according to the determined resource block size, transport block size and modulation and coding scheme.

In the determining the resource block size, the transport block size, and the modulation and coding scheme for the fallback Msg3, it is possible to obtain at least one of the resource block size, the transport block size, and the modulation and coding scheme for the fallback Msg3 according to the configuration information indicated by the fallback random access response. Specifically, the user equipment can always obtain the resource block size (a size and/or location of the time frequency resource) and/or transport block size and/or modulation and coding scheme according to the configuration information indicated by the fallback random access response. In particular, the user equipment may also obtain any two of the resource block size, the transport block size, and the modulation and coding scheme for the fallback Msg3 directly according to the configuration information indicated by the fallback random access response, and then derive another one of the resource block size, the transport block size, and the modulation and coding scheme for the fallback Msg3 according to the directly obtained two of the resource block size, the transport block size, and the modulation and coding scheme. For example, according to the resource block size, and the modulation and coding scheme directly informed by the configuration information indicated by the fallback random access response, the user equipment may calculate a transmittable transport block size according to the given modulation and coding scheme within the given time frequency resource size.

In the determining the resource block size, the transport block size, and the modulation and coding scheme for the fallback Msg3, it is also possible to use at least one of a resource block size, a transport block size, and a modulation and coding scheme used when sending the first message to determine at least one of the resource block size, the transport block size, and the modulation and coding scheme for the fallback Msg3. Specifically, the user equipment may always use the same resource block size (the size and/or location of the time frequency resource) and/or the same transport block size and/or the same modulation and coding scheme as those used to transmit the first message to determine the resource block size and/or the transport block size and/or the modulation and coding scheme for the fallback Msg3. In particular, when a configuration of one of the resource block size, the transport block size, and the modulation and coding scheme is the same as the corresponding configuration used by the previously transmitted first message, and another one of the resource block size, the transport block size, and the modulation and coding scheme is obtained from the configuration information indicated by the fallback random access response, the other one of the resource block size, the transport block size, and the modulation and coding scheme can be obtained by a calculation from the former two determined configurations. For example, the user equipment may determine available modulation and coding schemes using the same transport block size as the previous first message and the resource block size obtained through the configuration information indicated by the fallback random access response. In particular, if a modulation order has been set in advance, the user equipment may determine a coding rate, and if the available modulation coding scheme does not have only one configuration, the user equipment may select a modulation and coding scheme with a minimum (or a maximum) coding rate and/or a maximum (or minimum) modulation order from the available modulation and coding scheme. The above example is only exemplary, but the present disclosure is not limited thereto.

In the determining the resource block size, the transport block size, and the modulation and coding scheme for the fallback Msg3, it is also possible to determine whether the user equipment transmits the fallback Msg3 according to at least one of the resource block size, the transport block size, and the modulation and coding scheme notified by the configuration information indicated by the fallback random access response, and/or determine whether the network side needs to combine uplink data in the first message with the fallback Msg3 using at least one of 1-bit explicit indication mode, implicit indication mode and system predefined mode according to the obtained resource configuration information. In the present disclosure, the implicit indication mode refers to presetting modulation and coding scheme index values to indicate whether the user equipment transmits the fallback Msg3 according to at least one of the resource block size, the transport block size, and the modulation and coding scheme notified by the configuration information indicated by the fallback random access response, and/or whether the network side needs to combine the uplink data in the first message with the fallback Msg3, respectively.

For example, when the only one existing configuration available for the fallback Msg3 offers a transport block size which is not same as or smaller than the transport block size used by the user equipment for the uplink data in the sent first message, the user equipment may consider that this configuration is an error configuration. In this case, the user equipment does not expect to receive such configuration, the user equipment behavior is undefined, the user equipment may prepare to transmit the fallback Msg3 according to this configuration, and ignore whether the network side (for example, the base station) needs to combine the uplink data in the sent first message with the fallback Msg3. When the transport block size in the only one existing configuration available for fallback Msg3 is same as the transport block size used by the user equipment for the uplink data in the sent first message, the user equipment may prepare to transmit the fallback Msg3 according to this configuration. When the transport block size in the only one existing configuration available for fallback Msg3 is greater than the transport block size used by the user equipment for the uplink data in the sent first message, the user equipment may consider that this configuration is an error configuration, and does not expect to receive such configuration, the user equipment behavior is undefined, the user equipment may prepare to transmit the fallback Msg3 according to this configuration, and zero-pad the transmission block used by the uplink data in the sent first message (for example, pad delta zeros, where delta is a difference between the obtained transport block size and the transport block size used by the uplink data in the first message) to the transport block size of this configuration, thereafter perform the transmission. In particular, random redundancy bits, i.e., delta redundancy bits, can be padded, to serve for virtual Cyclic Redundancy Check (CRC).

In operation 770, the UE may transmit the PUSCH comprising the data part based on the determined the transport block size for transmitting a PUSCH. The user equipment performs an operation according to feedback for the fallback Msg3. For example, the user equipment searches for possible network feedback information in the configured downlink control search space after transmitting the fallback Msg3. For example, if retransmission scheduling information for the Msg3 is searched, the user equipment performs the retransmission of the Msg3, if conflict resolution information is searched, the user equipment read the conflict resolution information, if the conflict resolution succeeds, the user equipment completes the random access procedure, and if the conflict resolution has not been successful, the user equipment may retransmit the first message.

FIG. 8 illustrates a flow chart illustrating a method performed by a base station (BS) in a wireless communication system.

Referring to FIG. 8, in operation 810, the BS may receive a first message comprising a PRACH (Physical Random Access Channel) preamble based on a first transport block size. In order to achieve faster signal transmission and reception, the random access preamble is considered to be transmitted together with the data part (they are represented as a first message), and then feedback (represented as a second message) from the network side is searched in the downlink channel. However, since the preamble and payload (or the data part) are transmitted over different channel, it is possible that base station may only receive random access preamble in the first message (msgA) but fails to receive PUSCH payload (the data part) in the first message (msgA). In case base station is able to receive random access preamble in the first message (msgA) but fails to receive msgA payload (the data part), the BS does not transmit RAR (msgB) as the first message (msgA) is not successfully received. As a result, the UE will retransmit the first message (msgA) after the expiry of RAR window.

In operation 830, the BS may determine to transmit a fallback random access response in response to not receiving data part in the first message. In case BS is able to receive random access preamble in the first message (msgA) but fails to receive msgA payload (the data part) then instead of not transmitting random access response (msgB), it can transmit msgB including fallback information i.e. RAPID, TC-RNTI, UL grant and TA command. It is to be noted that fall back information is different than the information transmitted by the BS in case of successful msgA reception. In case of successful msgA reception, the BS transmits PDCCH addressed to RA-RNTI and msgB in scheduled TB includes C-RNTI, UL grant, TA command and UE contention resolution identity or gNB transmits PDCCH addressed to C-RNTI.

In operation 850, the BS may transmit a fallback random access response comprising information associated with a transport block size for transmitting a PUSCH (Physical Uplink Shared Channel).

According to the embodiments of the present disclosure, after transmitting the first message, the user equipment searches possible random access response on the configured or preset downlink control channel resources, and then performs different operations according to a type of the received feedback. Specifically, if the user equipment does not detect the available random access response, the first message is retransmitted. For example, the user equipment does not detect the available random access response in a specific case (including a case where the user equipment does not detect the downlink control information, or a case where the user equipment detects the downlink control information but does not detect matched feedback information in the downlink shared channel scheduled by the downlink control information (e.g., there is no matched preamble sequence and/or no a matched user equipment terminal identity or conflict resolution identity) and so on), in this case, the user equipment retransmits the first message.

If the user equipment detects successful random access response, it performs transmission of the uplink signal. For example, when detecting the successful random access response, the user equipment may perform the uplink transmission according to uplink scheduling information indicated in the random access response, and/or receive downlink data according to downlink scheduling information, and/or perform HARQ-ACK feedback according to PUCCH resource indication.

In operation 870, the BS may receive the PUSCH comprising the data part based on a second transport block size determined by the terminal. The user equipment performs an operation according to feedback for the fallback Msg3. For example, the user equipment searches for possible network feedback information in the configured downlink control search space after transmitting the fallback Msg3. For example, if retransmission scheduling information for the Msg3 is searched, the user equipment performs the retransmission of the Msg3, if conflict resolution information is searched, the user equipment read the conflict resolution information, if the conflict resolution succeeds, the user equipment completes the random access procedure, and if the conflict resolution has not been successful, the user equipment may retransmit the first message.

In the present disclosure, "user equipment" or "UE" may refer to any terminal having a wireless communication capability, including but not limit to mobile phone, cellular phone, smart phone or personal digital assistant (PDA), portable computer, image capture device such as digital camera, gaming device, music storage and playback device, and any portable unit or terminal having a wireless communication capability, or network facilities allowing wireless internet access or browsing.

A term "base station(BS)" or "network device" used in the present disclosure may refer to eNB, eNodeB, NodeB or Base Transceiver Station (BTS) or gNB etc according to the used technology and terms.

The "memory" used here may be any type suitable for the technical environment of the present disclosure, and may be implemented using any suitable data storage technology, including but not limit to semiconductor-based memory devices, magnetic memory devices and system, optical memory device and systems, fixed memory and removable memory.

The processor here may be any type suitable for the technical environment of the present disclosure, including but not limit to at least one or more of general-purpose computers, special-purpose computers, microprocessors, digital signal processors DSPs, and processors having a multi-core processor architecture.

The above are only preferred embodiments of the present disclosure and are not intended to limit the present disclosure. Any modification, equivalent replacement, or improvement made within the spirit and principle of the present disclosure should be included in the scope of protection of the present disclosure.

Those skilled in the art may understand that the present disclosure includes devices related to performing one or more the operations/steps in the present application. These devices may be specially designed and manufactured for required purposes, or they may be known devices in general-purpose computers. These devices have computer programs stored therein that are selectively activated or reconstructed. The computer programs may be stored in a device (e.g., a computer) readable medium or in any type of medium suitable for storing electronic instructions and coupled to a bus, respectively, the computer readable medium includes but not limited to any type of disks (including a floppy disk, a hard disk, an optical disc, a CD-ROM, and a magneto-optical disk), ROM (Read-Only Memory), RAM (Random Access Memory), EPROM (Erasable Programmable Read-Only Memory), EEPROM (Electrically Erasable Programmable Read-Only Memory), flash memory, magnetic card or optical card. That is, the readable medium includes any medium in which information is stored or transmitted in a readable form by a device, such as a computer.

It can be understood by those skilled in the art that computer program instructions may be used to implement each frame/block in these structural diagrams and/or block diagrams and/or flow diagrams and combinations of frames/blocks in these structural diagrams and/or block diagrams and/or flow diagrams. It can be understood by those skilled in the art that these computer program instructions may be provided to a processor of a general-purpose computer, a professional computer, or other processor which can program data processing methods, so as to implement the methods in the structural diagrams and/or block diagrams and/or flow diagrams as disclosed in the present disclosure by the computer or the other processor which can program data processing method.

It can be understood by those skilled in the art that steps, operations, methods and processes that have been discussed in the present disclosure can be alternated, modified, combined, or deleted. Further, other steps, operations, methods and processes that have been discussed in the present disclosure can also be alternated, modified, rearranged, decomposed, combined, or deleted. Further, steps, operations, methods, and processes in the prior art disclosed in the present disclosure can also be alternated, modified, rearranged, decomposed, combined, or deleted.

The above statements are only partial embodiments of the present disclosure, it should be pointed out that, to those ordinary skilled in the art, several improvements and polish can be made without departing from the principle of the present disclosure, also those improvements and polish should be considered as the protection scope of the present disclosure.

The invention claimed is:

1. A method, performed by a terminal, in a wireless communication system, the method comprising:

receiving, from a base station, an uplink configuration information associated with a first message for a 2-step random access, wherein in case that the terminal is in an Radio Resource Control (RRC) connected state, the uplink configuration information is included in terminal specific RRC information and in case that the terminal is in an RRC Idle state or RRC Inactive state, the uplink configuration information is included in system information;

transmitting the first message comprising a Physical Random Access Channel (PRACH) preamble and a Physical Uplink Shared Channel (PUSCH) based on the uplink configuration information;

receiving a feedback message comprising a Random Access Response (RAR) as a response to the transmitted first message;

identifying whether the RAR is a fallback RAR or a success RAR;

in case that the RAR is the fallback RAR:
    determining a transport block size for a PUSCH scheduled by the fallback RAR, wherein the transport block size for the PUSCH scheduled by the fallback RAR is same as a transport block size of the PUSCH included in the first message;
    determining a modulation and coding scheme for the PUSCH scheduled by the fallback RAR; and
    transmitting the PUSCH scheduled by the fallback RAR based on the determined transport block size and the determined modulation and coding scheme; and in case that the RAR is the success RAR:
    transmitting information related to Hybrid Automatic Repeat request-Acknowledgment, HARQ-ACK, feedback based on a Physical Uplink Control Channel (PUCCH) resource indicator included in the success RAR.

2. The method of claim 1, wherein the determining the transport block size for transmitting the PUSCH comprises:
    identifying the transport block size indicated by the fallback RAR is different from the transport block size of the PUSCH included in the first message; and
    determining the transport block size for transmitting the PUSCH based on a preset rule.

3. The method of claim 2, wherein the determining the transport block size for transmitting the PUSCH based on the preset rule comprises:
    in case that the transport block size indicated by the fallback RAR is greater than the transport block size of the PUSCH included in the first message, performing zero-padding on the transport block of the PUSCH included in the first message and determining a size of the zero-padded transport block of the first message as the transport block size for transmitting the PUSCH; and
    in case that the transport block size indicated by the fallback RAR is smaller than the transport block size of the first message, determining the transport block size of the PUSCH included in the first message as the transport block size for transmitting the PUSCH.

4. The method of claim 1, further comprising:
    when in the RRC Idle state or the RRC Inactive state, receiving the system information including the uplink configuration information associated with the first message for the 2-step random access; and
    wherein the transmitting the first message comprises transmitting the first message based on the uplink configuration information.

5. A terminal, in a wireless communication system, the terminal comprising:
    a memory;
    a transceiver; and
    at least one processor operably connected to the transceiver, the at least one processor configured to:
        control the transceiver to receive, from a base station, an uplink configuration information associated with a first message for a 2-step random access, wherein in case that the terminal is in an Radio Resource Control (RRC) connected state, the uplink configuration information is included in terminal specific RRC information and in case that the terminal is in an RRC Idle state or RRC Inactive state, the uplink configuration information is included in system information message
        control the transceiver to transmit the first message comprising a Physical Random Access Channel (PRACH) preamble and a Physical Uplink Shared Channel (PUSCH) based on the uplink configuration information;
        control the transceiver to receive a feedback message comprising a Random Access Response (RAR) as a response to the transmitted first message,
        identify whether the RAR is a fallback RAR or a success RAR,
        in case that the RAR is the fallback RAR:
            control the transceiver to determine a transport block size for a PUSCH scheduled by the fallback RAR, wherein the transport block size for the PUSCH scheduled by the fallback RAR is same as a transport block size of the PUSCH included in the first message,
            control the transceiver to determine a modulation and coding scheme for the PUSCH scheduled by the fallback RAR, and
            control the transceiver to transmit the PUSCH scheduled by the fallback RAR based on the determined transport block size and the determined modulation and coding scheme; and
        in case that the RAR is the success RAR:
            control the transceiver to transmit information related to Hybrid Automatic Repeat request-Acknowledgment, HARQ-ACK, feedback based on a Physical Uplink Control Channel (PUCCH) resource indicator included in the success RAR.

6. The terminal of claim 5, wherein the at least one processor is further configured to:
    identify the transport block size indicated by the fallback RAR is different from the transport block size of the PUSCH included in the first message; and
    determine the transport block size for transmitting the PUSCH based on a preset rule.

7. The terminal of claim 5, wherein the at least one processor is further configured to:
    when in the RRC Idle state or the RRC Inactive state, receive the system information including the uplink configuration information associated with the first message for the 2-step random access, and
    transmit the first message based on the uplink configuration information.

8. A method, performed by a base station (BS), of receiving an uplink signal in a wireless communication system, the method comprising:
    transmitting, to a terminal, an uplink configuration information associated with a first message for a 2-step random access, wherein in case that the terminal is in an Radio Resource Control (RRC) connected state, the uplink configuration information is included in terminal specific RRC information and in case that the terminal is in an RRC Idle state or RRC Inactive state, the uplink configuration information is included in system information;

receiving, from the terminal, the first message based on the first uplink configuration information;

identifying whether the first message comprises a Physical Random Access Channel (PRACH) preamble or a Physical Uplink Shared Channel (PUSCH);

in case that the first message comprises the PRACH preamble and does not comprise the PUSCH:

transmitting, to the terminal, a feedback message comprising a fallback Random Access Response (RAR); and receiving a PUSCH based on a second transport block size and a modulation and coding scheme determined by a terminal, wherein the second transport block size is the same as a first transport block size of the PUSCH included in the first message; and in case that the first message comprises the PRACH preamble and the PUSCH:

transmitting, to the terminal, a feedback message comprising a success RAR; and receiving, from the terminal, Hybrid Automatic Repeat reQuest-Acknowledgment (HARQ-ACK) feedback according to a Physical Uplink Control Channel (PUCCH) resource indicator included in the success RAR.

9. The method of claim 8, wherein the second transport block size is determined based on a preset rule when a transport block size indicated by the fallback RAR is different from the transport block size of the PUSCH included in the first message.

10. The method of claim 8, further comprising:

wherein in case that the terminal in the RRC Idle state or in the RRC Inactive state transmitting, the system information including the uplink configuration information associated with the first message for the 2-step random access, and wherein the receiving the first message comprises receiving the first message based on the uplink configuration information.

11. A base station (BS) in a wireless communication system, the base station comprising:

a transceiver; and at least one processor operably connected to the transceiver, the at least one processor configured to:

control the transceiver to transmit, to a terminal, an uplink configuration information associated with a first message for a 2-step random access, wherein in case that the terminal is in an Radio Resource Control (RRC) connected state, the uplink configuration information is included in terminal specific RRC information and in case that the terminal is in an RRC Idle state or RRC Inactive state, the uplink configuration information is included in system information, control the transceiver to receive, from the terminal, the first message based on the uplink configuration information, identify whether the first message comprises a Physical Random Access Channel (PRACH) preamble or Physical Uplink Shared Channel (PUSCH), in case that the first message comprises the PRACH preamble and does not comprise the PUSCH, transmit, to the terminal, a fallback Random Access Response (RAR); and receive a PUSCH based on a second transport block size and a modulation and coding scheme determined by a terminal, wherein the second transport block size is the same as a first transport block size of the PUSCH included in the first message; and in case that the first message comprises the PRACH preamble and the PUSCH:

transmit, to the terminal, a feedback message comprising a success RAR; and receive, from the terminal, Hybrid Automatic Repeat reQuest-Acknowledgment (HARQ-ACK) feedback according to a Physical Uplink Control Channel PUCCH) resource indicator included in the success RAR.

12. The base station of claim 11, wherein the second transport block size is determined based on a preset rule when a transport block size indicated by the fallback RAR is different from the transport block size of the PUSCH included in the first message.

13. The base station of claim 11, wherein the at least one processor is further configured to:

wherein in case that the terminal in the RRC Idle state or in the RRC Inactive state control the transceiver to transmit the system information including the uplink configuration information associated with the first message for the 2-step random access, and wherein the receiving the first message comprises receiving the first message based on the uplink configuration information.

* * * * *